(12) United States Patent
Isobe et al.

(10) Patent No.: US 10,697,995 B2
(45) Date of Patent: Jun. 30, 2020

(54) ACCELERATION SENSOR INCLUDING IMPROVED MASS BODY

(71) Applicant: Hitachi, Ltd., Chiyoda-ku, Tokyo (JP)

(72) Inventors: Atsushi Isobe, Tokyo (JP); Yuudai Kamada, Tokyo (JP); Chisaki Takubo, Tokyo (JP); Noriyuki Sakuma, Tokyo (JP); Tomonori Sekiguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 15/932,213

(22) Filed: Feb. 16, 2018

(65) Prior Publication Data

US 2018/0238929 A1 Aug. 23, 2018

(30) Foreign Application Priority Data

Feb. 17, 2017 (JP) ................. 2017-028316

(51) Int. Cl.
*G01P 15/125* (2006.01)
*G01P 15/097* (2006.01)
*G01P 15/08* (2006.01)

(52) U.S. Cl.
CPC .......... *G01P 15/125* (2013.01); *G01P 15/097* (2013.01); *G01P 2015/0831* (2013.01)

(58) Field of Classification Search
CPC ...... G01P 15/125; G01P 15/097; G01P 15/04; G01P 15/06; G01P 15/038; G01P 2015/0831; G01P 1/026; G01P 3/443; G01P 7/00; G01C 19/56; G01C 19/02; G01C 19/065; G01C 19/5642; G01C 19/5649; G01C 19/5656; G01C 19/5663; G01C 23/00

See application file for complete search history.

(56) References Cited

U.S. PATENT DOCUMENTS

2016/0091524 A1 3/2016 Kamada et al.

FOREIGN PATENT DOCUMENTS

JP 2016-70817 A 5/2016

*Primary Examiner* — Harshad R Patel
*Assistant Examiner* — Nigel H Plumb
(74) *Attorney, Agent, or Firm* — Crowell & Moring LLP

(57) ABSTRACT

An acceleration sensor with an improved membrane (mass body) is provided. The membrane includes a moving portion, a moving portion electrically separated from the moving portion, and a mechanical junction portion that mechanically connects the moving portion and the moving portion in a y-axis direction. The mechanical junction portion includes a first portion extending in a direction having a first angle with respect to the y-axis direction and a second portion extending in a direction having a second angle different from the first angle with respect to the y-axis direction in an xy plane, and is formed to have a non-linear shape in an x-axis direction. The acceleration sensor with improved the membrane stably operates by reducing a variation in a capacity value of a detection electrode and has an excellent noise characteristic.

7 Claims, 18 Drawing Sheets

S1 : ACCELERATION SENSOR
32BD : MOVING PORTION
32TD : MOVING PORTION
32m : MECHANICAL JUNCTION PORTION

ACCELERATION SENSOR INCLUDING IMPROVED MASS BODY

BACKGROUND OF THE INVENTION

Field of the Invention

The present invention relates to an acceleration sensor, and more particularly, to an acceleration sensor that detects, for example, minute vibration acceleration.

Background Art

In a field of underground resource exploration, reflection method elastic wave exploration using an acceleration sensor has been performed. The reflection method elastic wave exploration, which is a kind of physical exploration, is a method of artificially generating seismic waves, capturing reflected waves rebounding from underground by a geophone installed on a ground surface, and analyzing the result to elucidate an underground structure.

In the reflection method elastic wave exploration, elastic waves are excited from an excitation source installed on the ground surface into the ground, and the elastic waves reflected from a boundary of a stratum are sensed by the geophone installed on the ground surface. The elastic waves excited in various directions propagate through the ground having great attenuation, are reflected from a plurality of strata, propagate through the ground having great attenuation again, are diffused to a wide region, and return to the ground surface.

Therefore, the acceleration sensor used for the reflection method elastic wave exploration needs to detect acceleration which is applied in a perpendicular direction, that is, in the same direction as gravitational acceleration and is smaller than the gravitational acceleration. That is, in the acceleration sensor used for the reflection method elastic wave exploration, it is necessary to improve the sensitivity of acceleration in the perpendicular direction.

The related art of this technical field includes JP-A-2016-070817. JP-A-2016-070817 discloses an inertial sensor which is capable of controlling a deviation between an electrostatic capacity of a first MEMS element and an electrostatic capacity of a second MEMS element by mechanically connecting a first moving portion and a second moving portion by means of a mechanical junction portion while electrically separating the moving portions from each other.

SUMMARY OF THE INVENTION

In the acceleration sensor used for the reflection method elastic wave exploration, four detection electrodes are installed in one membrane (mass body) in order to improve the sensitivity of acceleration.

However, when the membrane is housed or mounted, the membrane is bent due to stress applied thereto, and thus a capacity value of the detection electrode may vary. As a result of detailed examination, a variation in the capacity value of the detection electrode makes servo control unstable and results in an increase in noise, and thus it has become obvious that it is not possible to realize a high precision acceleration sensor.

Consequently, the invention provides a high precision acceleration sensor that stably operates by reducing a variation in a capacity value of the detection electrode and has an excellent noise characteristic.

According to an aspect of the present invention, there is provided an acceleration sensor including a first substrate, a second substrate which is provided so as to be separated from the first substrate in a first direction, and a mass body which is provided between the first substrate and the second substrate and is displaceable in the first direction. The mass body includes a first moving portion, a second moving portion which is electrically separated from the first moving portion, and a first mechanical junction portion which mechanically connects the first moving portion and the second moving portion to each other in a second direction orthogonal to the first direction, and the mechanical junction portion includes a first portion extending in a direction having a first angle with respect to the second direction and a second portion extending in a direction having a second angle different from the first angle with respect to the second direction, in a plane orthogonal to the first direction.

According to the invention, it is possible to provide a high precision acceleration sensor that stably operates by reducing a variation in a capacity value of a detection electrode and has an excellent noise characteristic.

Problems, configurations, and effects other than those described above are clarified by a description of the following embodiment.

DETAILED DESCRIPTION OF THE INVENTION

Figure 1:
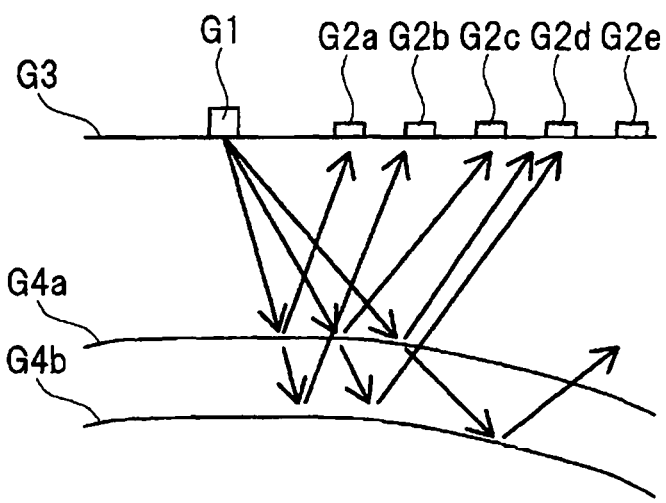
FIG. 1 is a schematic cross-sectional view of a ground surface illustrating an outline of reflection method elastic wave exploration.

Hereinafter, an embodiment of the invention will be described in detail with reference to the accompanying drawings. Meanwhile, members having the same function are denoted by the same or related reference numerals and signs in all drawings for describing the embodiment, and the repetitive description thereof will be omitted. In addition, when there are similar members (portions), a generic reference of the members may be added with a symbol to denote an individual or specific portion. In addition, the description of the same or similar portions is not repeated in principle unless particularly required in the following embodiment.

Further, in the drawings used in the embodiment, hatching may be omitted to facilitate the viewing of the drawings even in a cross-sectional view. In addition, hatching may be used to facilitate the viewing of the drawings even in a plan view.

Moreover, in a cross-sectional view and a plan view, the dimensions of each part are not intended to correspond to those of an actual device, and a specific part may be represented in a relatively magnified manner in order to facilitate the understanding of the drawings. In addition, even when a cross-sectional view and a plan view correspond to each other, the dimensions of each part may be represented in a relatively magnified manner in order to facilitate the understanding of the drawings.

Reflection Method Elastic Wave Exploration Method

First, reflection method elastic wave exploration using an acceleration sensor which is performed in an underground resources exploration field will be described. The reflection method elastic wave exploration, which is a kind of physical exploration, is a method of artificially generating seismic waves, capturing reflected waves rebounding from underground by a geophone installed on a ground surface, and analyzing the result to elucidate an underground structure.

FIG. 1 is a schematic cross-sectional view of a ground surface illustrating an outline of reflection method elastic wave exploration.

As illustrated in FIG. 1, in reflection method elastic wave exploration, elastic waves (indicated by arrows in FIG. 1) are excited from an excitation source G1 installed on a ground surface G3 into the ground, and the elastic waves reflected from a boundary G4a or a boundary G4b of a stratum are sensed by any one of geophones G2a, G2b, G2c, G2d, and G2e installed on the ground surface G3.

Since the excitation source G1 generally oscillates in the vertical direction with respect to the ground surface G3, P waves are efficiently excited in a direction close to perpendicularity. For this reason, in the reflection method elastic wave exploration, P waves are used. Since the elastic waves returning to the ground surface G3 again are P waves that propagate from a direction close to a perpendicular direction, the geophones G2a, G2b, G2c, G2d, and G2e need to detect elastic vibration in the perpendicular direction.

The elastic waves excited in various directions propagate through the ground having great attenuation, are reflected from the boundaries G4a and G4b of a plurality of strata, propagate through the ground having great attenuation again, are diffused to a wide region, and return to the ground surface G3.

Since weak elastic vibration is detected, it is necessary to use an acceleration sensor that has high sensitivity in a perpendicular direction as the geophones G2a, G2b, G2c, G2d, and G2e. Therefore, it is preferable to use acceleration sensors according to Examples 1, 2, and 3 to be described below, as the geophones G2a, G2b, G2c, G2d, and G2e.

Example 1

Configuration of Acceleration Sensor

A configuration of an acceleration sensor according to Example 1 will be described with reference to FIGS. 2 to 8.

Figure 2:
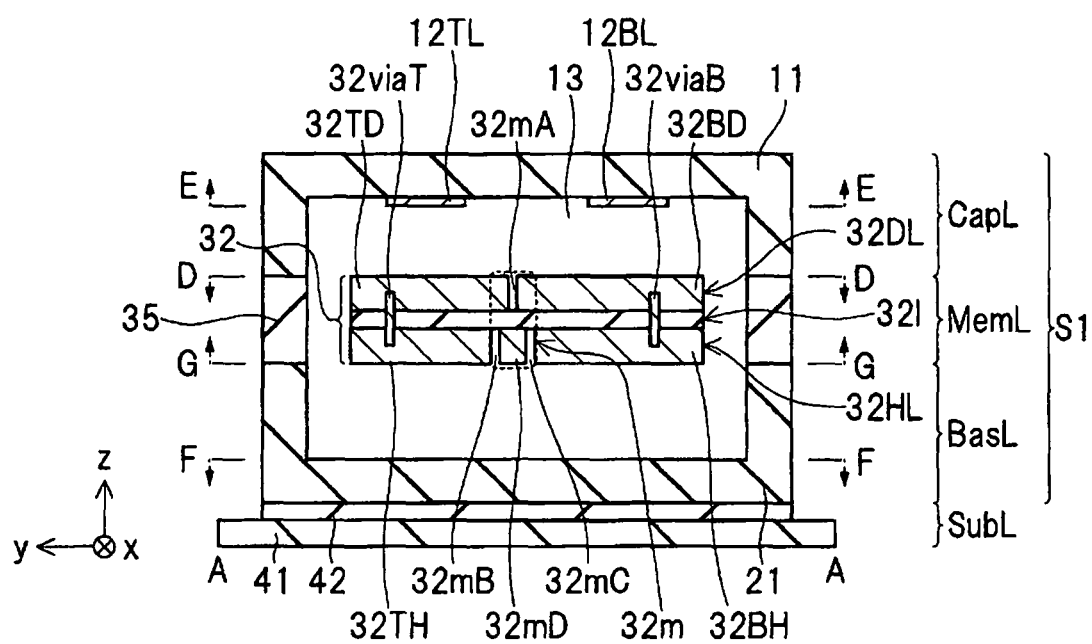
FIG. 2 is a cross-sectional view of an acceleration sensor according to Example 1.
Figure 3:
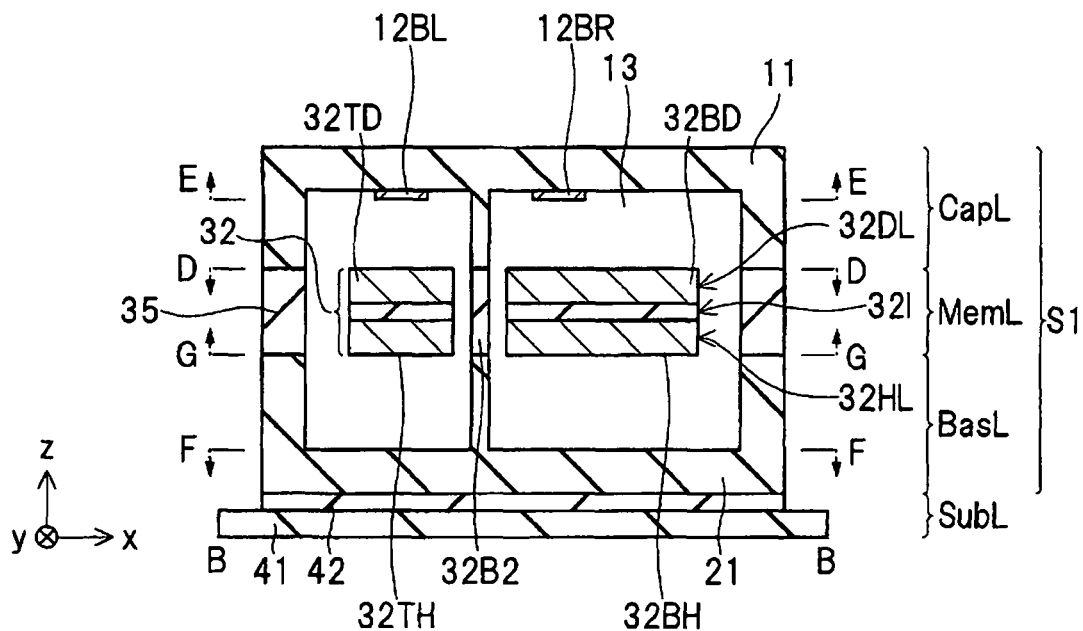
FIG. 3 is a cross-sectional view of the acceleration sensor according to Example 1.
Figure 4:
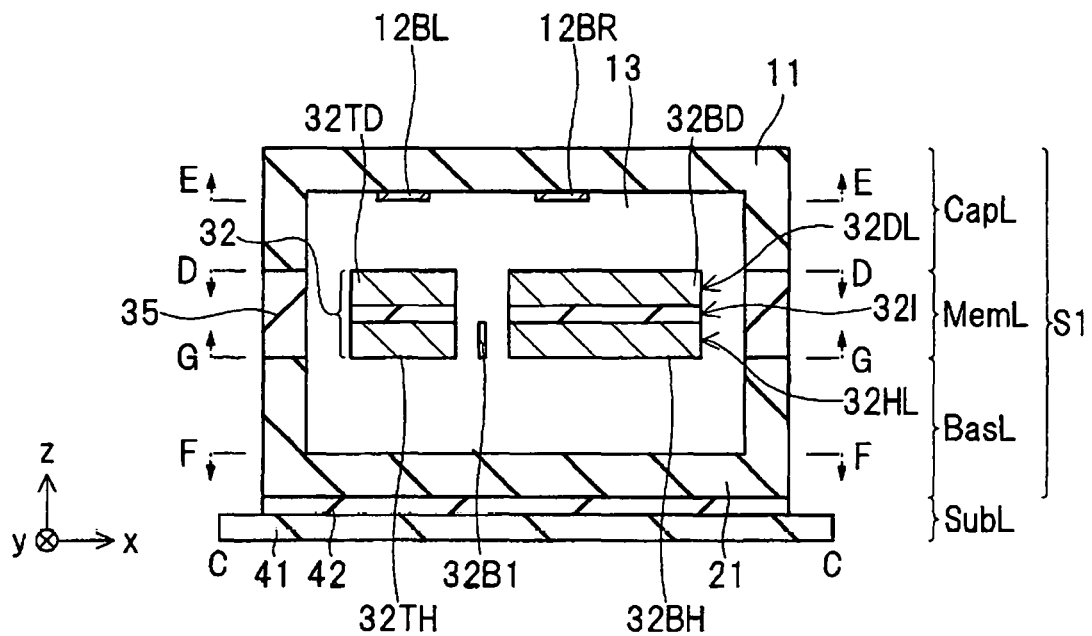
FIG. 4 is a cross-sectional view of the acceleration sensor according to Example 1.

FIGS. 2 to 4 are cross-sectional views of the acceleration sensor according to Example 1. FIGS. 5 to 8 are plan views of the acceleration sensor according to Example 1.

Figure 5:
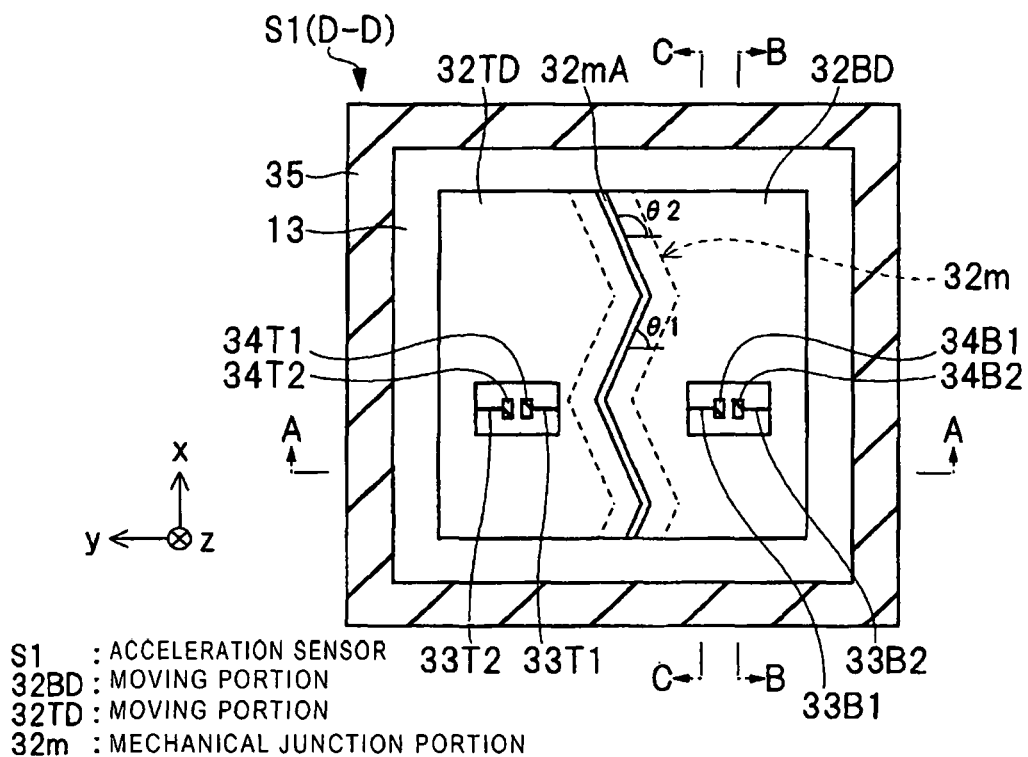
FIG. 5 is a plan view illustrating an upper surface of a membrane layer of the acceleration sensor according to Example 1.
Figure 6:
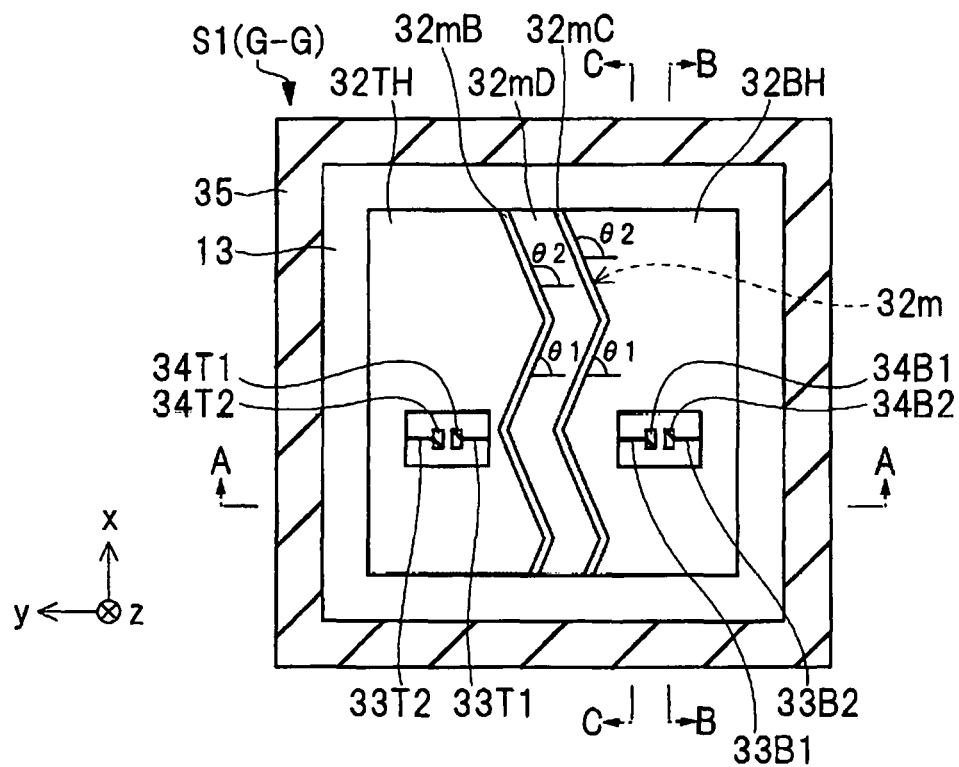
FIG. 6 is a plan view illustrating a lower surface of the membrane layer of the acceleration sensor according to Example 1.
Figure 7:
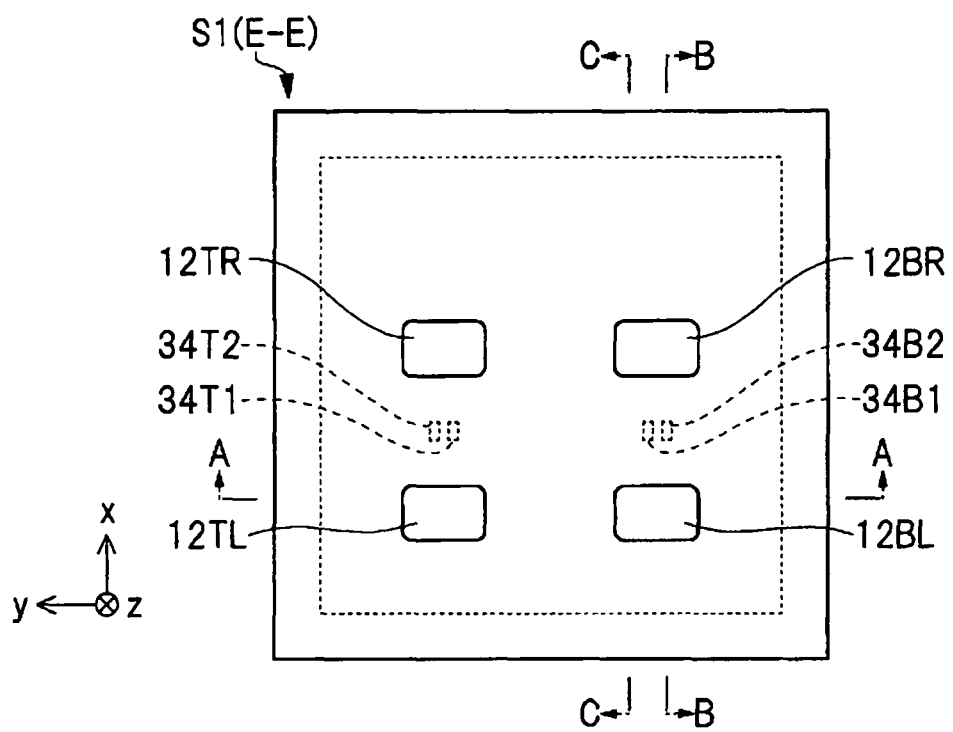
FIG. 7 is a plan view illustrating a lower surface of a cap layer of the acceleration sensor according to Example 1.
Figure 8:
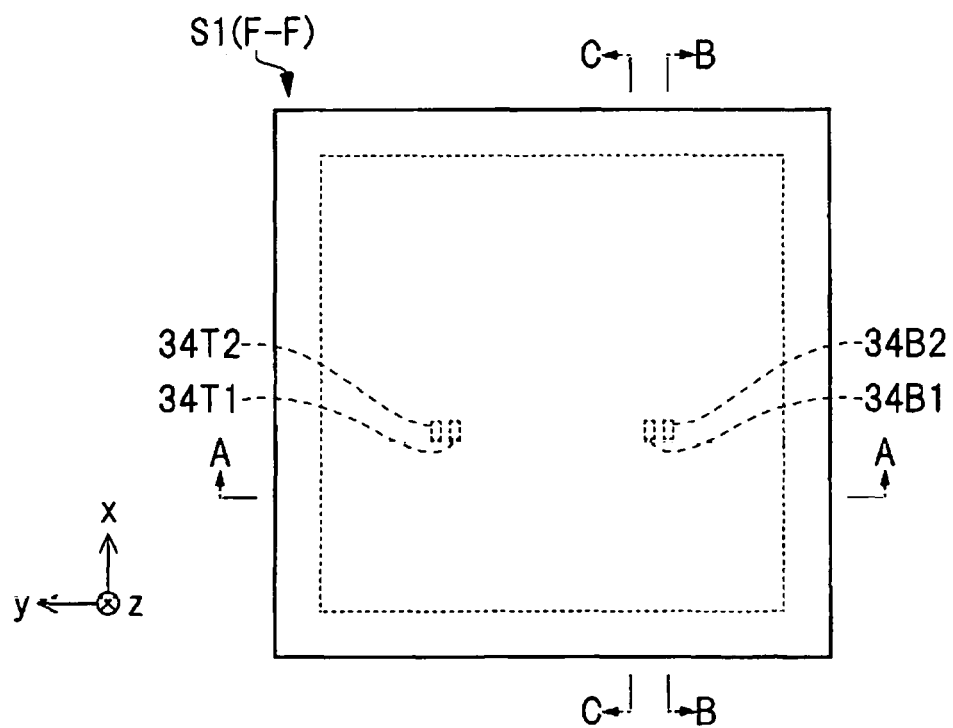
FIG. 8 is a plan view illustrating an upper surface of a base layer of the acceleration sensor according to Example 1.

FIG. 2 is a cross-sectional view taken along line A-A of FIGS. 5 to 8. FIG. 3 is a cross-sectional view taken along line B-B of FIGS. 5 to 8. FIG. 4 is a cross-sectional view taken along line C-C of FIGS. 5 to 8. FIG. 5 is a plan view taken along line D-D of FIGS. 2 to 4, and is a plan view illustrating an upper surface of a membrane layer. FIG. 6 is a plan view taken along line G-G of FIGS. 2 to 4, and is a plan view illustrating a lower surface of the membrane layer. FIG. 7 is a plan view taken along line E-E of FIGS. 2 to 4, and is a plan view illustrating a lower surface of a cap layer. FIG. 8 is a plan view taken along line F-F of FIGS. 2 to 4, and is a plan view illustrating an upper surface of a base layer.

An acceleration sensor S1 according to Example 1 is constituted by a stack of a base layer BasL, a membrane layer MemL, and a cap layer CapL, and is mounted on a mounting substrate layer SubL.

In the following description, when seen in a plan view, two directions that are orthogonal to each other, preferably, two directions that are perpendicular to each other are set to be an x-axis direction and a y-axis direction, and a direction perpendicular to a principal plane of the mounting substrate layer SubL is set to be a z-axis direction. In addition, the wording "when seen in a plan view" means a case when seen from the z-axis direction which is a direction perpendicular to an upper surface as the principal plane of the mounting substrate layer SubL.

As illustrated in FIGS. 2 to 4 and FIG. 7, the cap layer CapL includes an insulating material 11, a cavity 13, and fixation electrodes 12TL, 12TR, 12BL, and 12BR. The insulating material 11 is configured such that concave portions are formed in the lower surface thereof in portions other than junctions with a side portion 35 of the membrane layer MemL and fixed portions 34T1, 34T2, 34B1, and 34B2 (see FIG. 5), and fixation electrodes 12TL, 12TR, 12BL, and 12BR are installed in the concave portions. The insulating material 11 is installed in an upper portion of the membrane layer MemL, and thus functions as a cap for sealing the cavity 13. In addition, the fixation electrodes 12TL and 12TR are paired with a moving portion (moving electrode) 32TD formed in the membrane layer MemL to function as fixation electrodes which are variable capacitors, and the fixation electrodes 12BL and 12BR are paired with a moving portion (moving electrode) 32BD formed in the membrane layer MemL to function as fixation electrodes of variable capacitors.

As illustrated in FIGS. 2 to 4, FIG. 5, and FIG. 6, the membrane layer MemL includes a membrane (mass body) 32, torsional springs 33T1, 33T2, 33B1, and 33B2, fixed portions 34T1, 34T2, 34B1, and 34B2, and the side portion 35. The side portion 35 functions as a side portion for sealing the cavity 13.

The membrane 32 includes a conductive layer 32DL, an insulating material 32I, and a conductive layer 32HL. Further, the conductive layer 32DL constitutes the moving portions 32TD and 32BD, and the conductive layer 32HL constitutes moving portions 32TH and 32BH, and a conductive material 32mD, and the conductive layers are mechanically formed as one body. The moving portion 32TD is paired with the fixation electrodes 12TL and 12TR formed in the cap layer CapL to function as a moving electrode of a variable capacitor. The moving portion 32BD is paired with the fixation electrodes 12BL and 12BR formed in the cap layer CapL to function as a moving electrode of a variable capacitor. The moving portions 32TH and 32BH function as reinforcing materials for increasing mechanical strength of the membrane 32.

Meanwhile, an opening may be formed in the conductive layer 32DL, the insulating material 32I, and the conductive layer 32HL. Since this embodiment has effects regardless of the presence or absence of an opening, the opening will be omitted in the following description.

The conductive layers 32DL and 32HL have a function of increasing the mass of the membrane 32. For this reason, the membrane 32 itself functions as a mass body.

Gaps 32mA, 32mB, and 32mC, the conductive material 32mD, a portion of the insulating material 32I, and portions of moving portions 32TD and 32BD constitute a mechanical junction portion 32m. The portion of the insulating material 32I is a first portion of the insulating material 32I right above the gap 32mB, a second portion of the insulating material 32I right above the gap 32mC, and a third portion of the insulating material 32I which is interposed between the first portion and the second portion. In addition, the portions of the moving portions 32TD and 32BD are a fourth portion of the moving portion 32TD right above the gap 32mB, a fifth portion of the moving portion 32BD right above the gap 32mC, and sixth portions of the moving portions 32TD and 32BD-which are interposed between the fourth portion and the fifth portion.

As illustrated in FIGS. 5 and 6, each of the gaps 32mA, 32mB, and 32mC does not extend along one direction when seen in a plan view, that is, the x-axis direction, and has a non-linear shape. Specifically, each of the gaps 32mA, 32mB, and 32mC has a shape in which a portion extending in a direction having a first angle with respect to the x-axis direction or the y-axis direction which is perpendicular to the z-axis direction and a portion extending in a direction having a second angle different from the first angle with respect to the x-axis direction or the y-axis direction which is perpendicular to the z-axis direction alternately connected to each other. For example, as illustrated in FIGS. 5 and 6, each of the gaps 32mA, 32mB, and 32mC has a portion extending in a direction having a first angle $\theta 1$ with respect to the y-axis direction and a portion extending in a direction having a second angle $\theta 2$ with respect to the y-axis direction.

Thereby, the mechanical junction portion 32m does not extend along one direction when seen in a plan view, that is, the x-axis direction and has a non-linear shape. Specifically, the mechanical junction portion 32m extends in a direction having a first angle with respect to the x-axis direction or the y-axis direction which is perpendicular to the z-axis direction at a first location, and extends in a direction having a second angle different from the first angle with respect to the x-axis direction or the y-axis direction which is perpendicular to the z-axis direction at a second location different from the first location. For example, as illustrated in FIGS. 5 and 6, the mechanical junction portion 32m has a first location extending in a direction having a first angle $\theta 1$ with respect to the y-axis direction and a second location extending in a direction having a second angle $\theta 2$ with respect to the y-axis direction.

The gap 32mA functions as an insulator that DC-electrically insulates the moving portion 32TD and the moving portion 32BD from each other, the gap 32mB functions as an insulator that DC-electrically insulates the moving portion 32TH and the conductive material 32mD from each other, and the gap 32mC functions as an insulator that DC-electrically insulates the conductive material 32mD and the moving portion 32BH from each other. In addition, the insulating material 32I functions as an insulator that DC-electrically insulates the moving portion 32TD and the conductive material 32mD from each other and functions as an insulator that DC-electrically insulates the moving portion 32BD and the conductive material 32mD from each other.

The insulating material 32I may be partially removed in a range in which a failure does not occur in the above-described functions. Regarding the insulating material 32I, the deformation of the membrane 32 can be suppressed when the volume of the insulating material 32I constituting the membrane 32 is reduced in order to decrease a thermal expansion of the membrane 32, and thus it is possible to reduce variations in a capacity value of the detection electrode. For example, operation is further stabilized and noise is reduced by removing the insulating material 32I right below the gap 32mA, the insulating material 32I right above the gap 32mB, and the insulating material 32I right above the gap 32mC, and thus it is possible to provide the high precision acceleration sensor.

The moving portion 32TD is DC-electrically connected to the moving portion 32TH through a conductive material 32viaT. In addition, the moving portion 32BD is DC-electrically connected to the moving portion 32BH through a conductive material 32viaB. Thereby, it is possible to reduce the electric resistance of the moving portions 32TD and 32BD. On the other hand, the conductive material 32mD DC-electrically floats. Thereby, AC electrical isolation between the moving portion 32TD and the moving portion 32BD is improved.

The conductive material 32mD is disposed so as to cover the gap 32mA from below, and functions as a reinforcing material for increasing mechanical strength in the vicinity of the gap 32mA. The moving portion 32TD is disposed so as to cover the gap 32mB from above, and functions as a reinforcing material for increasing mechanical strength in the vicinity of the gap 32mB. The moving portion 32BD is disposed so as to cover the gap 32mC from above, and functions as a reinforcing material for increasing mechanical strength in the vicinity of the gap 32mC.

Although not shown in the drawing, the fixation electrodes 12TL, 12TR, 12BL, and 12BR and the moving electrodes 32TD and 32BD functioning as variable capacitors have electrical lead wires installed therein and are electrically connected to the outside of the acceleration sensor S1.

As illustrated in FIGS. 4 to 6, each of the torsional springs 33T1, 33T2, 33B1, and 33B2 has a plate like shape which is thin in the x-axis direction and is long in the y-axis direction, and functions as a torsional spring that allows a torsional motion with the y-axis as a rotation axis. Further, one end sides of the torsional spring 33T1, the torsional spring 33T2, the torsional spring 33B1, and the torsional spring 33B2 are connected to the membrane 32 and the other end sides thereof are respectively connected to the fixed portion 34T1, the fixed portion 34T2, the fixed portion 34B1, and the fixed portion 34B2, and thus the membrane 32 also has a function of allowing a torsional motion with the y-axis as a rotation axis. Further, the torsional springs 33T1, 33T2, 33B1, and 33B2 are configured such that the lengths in the y-axis direction and the widths in the z-axis direction are set to be larger than the thicknesses in the x-axis direction, and thus the membrane 32 also has a function of suppressing a rotational motion and a translational motion other than the torsional motion with the y-axis as a rotation axis.

As illustrated in FIGS. 3, 7, and 8, the fixed portions 34T1, 34T2, 34B1, and 34B2 function as fixed portions that are mechanically firmly connected to the cap layer CapL and the base layer BasL and mechanically fixes ends of the torsional springs 33T1, 33T2, 33B1, and 33B2. In addition, the fixed portions also function as reinforcing materials for increasing the mechanical strength of the insulating material 11 of the cap layer CapL.

As illustrated in FIGS. 2 to 4 and FIG. 8, the base layer BasL includes an insulating material 21 and the cavity 13. The insulating material 21 is configured such that concave portions are formed in the upper surface in portions other than junctions between the side portion 35 of the membrane layer MemL and the fixed portions 34T1, 34T2, 34B1, and 34B2 (see FIG. 5). The insulating material 21 is installed in a lower portion of the membrane layer MemL, and thus functions as a bottom for sealing the cavity 13. In addition, the insulating material functions as a portion which is a mechanically junction portion to the mounting substrate layer SubL.

The mounting substrate layer SubL includes an insulating material 41 and an adhesive material 42 installed on the upper surface of the insulating material. The insulating material 41 is a substrate on which the acceleration sensor S1 is mounted, and is, for example, a package, a circuit substrate, a mother board, or the like which is formed of a resin or ceramics. The adhesive material 42 functions as a bonding material that mechanically joins the acceleration sensor S1 and the insulating material 41 to each other.

The insulating materials 11 and 21 are formed of a material, such as glass or high-resistance silicon, which has a large resistance value. The insulating materials may be materials, such as a metal or low-resistance silicon, which have a small resistance value. However, in this case, it is necessary to form an insulating material between the insulating material 11 and the fixation electrodes 12TL, 12TR, 12BL, and 12BR in order to electrically insulate the insulating material 11 and the fixation electrodes 12TL, 12TR, 12BL, and 12BR from each other.

The conductive layers 32DL and 32HL are formed of a material, such as a metal or low-resistance silicon, which has a small resistance value. When the moving portions 32TD and 32BD are formed by hollowing out a portion of the conductive layer 32DL, the thickness of the moving portion 32TD and the thickness of the moving portion 32BD can be made to match each other, and thus it is possible to increase the precision of the acceleration sensor S1. Similarly, when the moving portions 32TH and 32BH, the conductive material 32mD, and the torsional springs 33T1, 33T2, 33B1, and 33B2 are formed by hollowing out a portion of the conductive layer 32HL, the thicknesses of the moving portions 32TH and 32BH, the thickness of the conductive material 32mD, and the thicknesses of the torsional springs 33T1, 33T2, 33B1, and 33B2 can be made to match each other, and thus it is possible to increase the precision of the acceleration sensor S1.

In addition, when the membrane 32 is formed by hollowing out, for example, a Silicon On Insulator (SOI) substrate, the thickness of the insulating material 32I can be made uniform, and thus it is possible to further increase the precision of the acceleration sensor S1.

The acceleration sensor S1 is constituted by a stack of the cap layer CapL, the membrane layer MemL, and the base layer BasL, as illustrated in FIG. 2. Since these layers have different thermal expansions, stress is generated within the acceleration sensor S1 during the bonding of the layers or due to changes in environmental temperature. For example, in a case where the cap layer CapL is constituted by a single crystalline silicon substrate and the membrane layer MemL is constituted by a SOI substrate, the single crystalline silicon substrate has a larger thermal expansion in xy planes orthogonal to each other in the z-axis direction than the SOI substrate.

For this reason, a force is applied in a direction in which the cap layer CapL expands the fixed portion 34T2 and the fixed portion 34B2 in a case where temperature rises, and a force is applied in a direction in which the cap layer CapL narrows the fixed portion 34T2 and the fixed portion 34B2 in a case where temperature falls. Similarly, a force is also applied to the fixed portion 34T2 and the fixed portion 34B2 from the base layer BasL and the mounting substrate layer SubL. This force serves as a tensile force or a compression force to the membrane 32 through the torsional springs 33B2 and 33T2.

Figure 9:
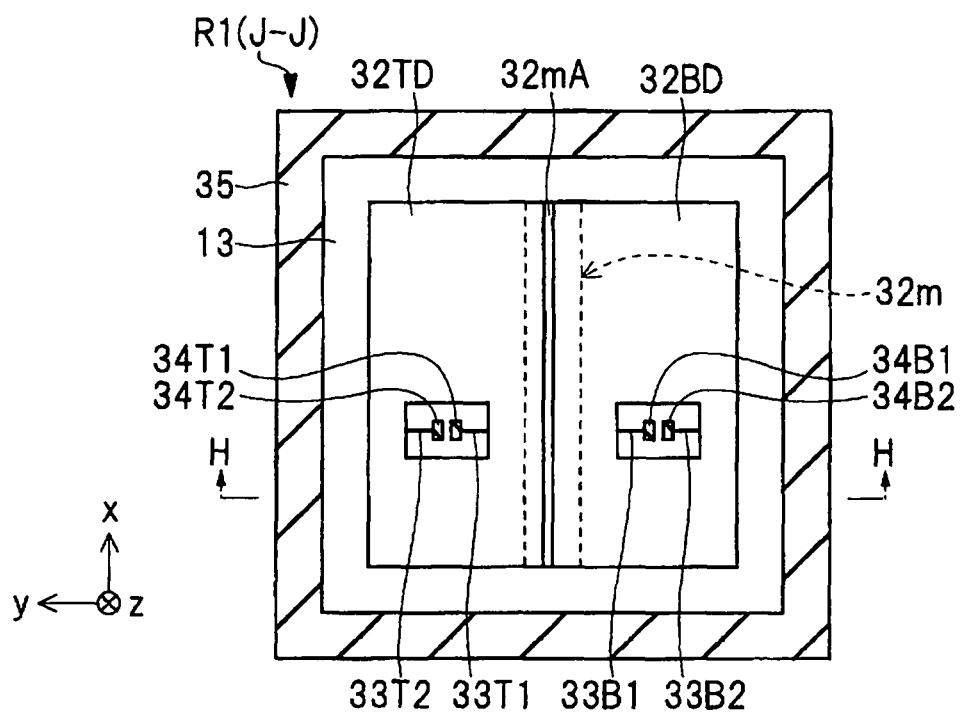
FIG. 9 is a plan view illustrating an upper surface of a membrane layer of an acceleration sensor according to a comparative example.
Figure 10:
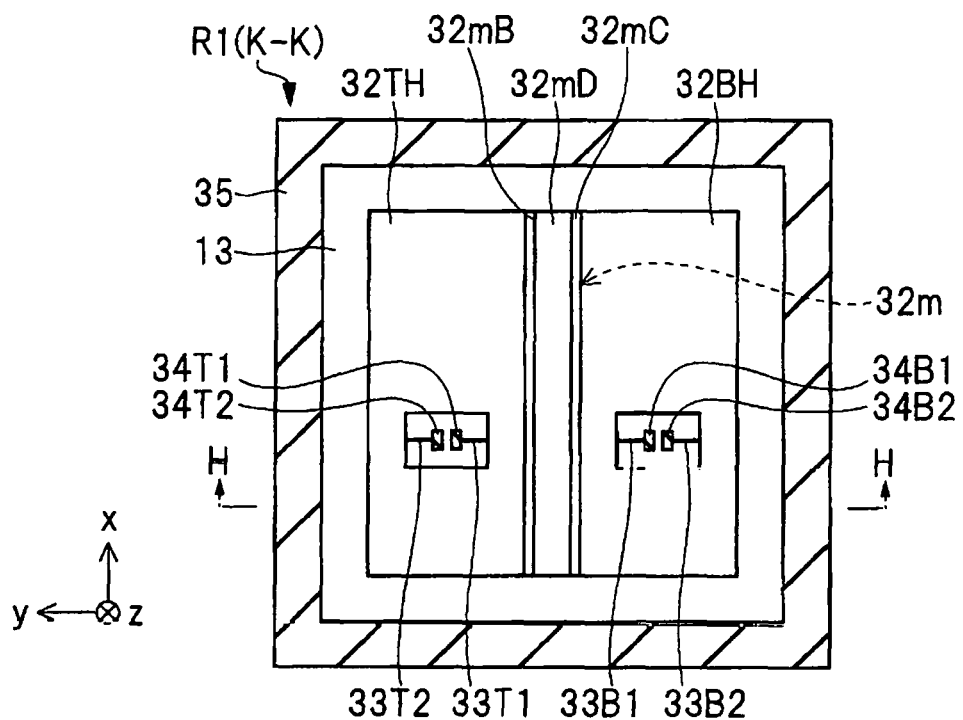
FIG. 10 is a plan view illustrating a lower surface of the membrane layer of the acceleration sensor according to the comparative example.
Figure 11:
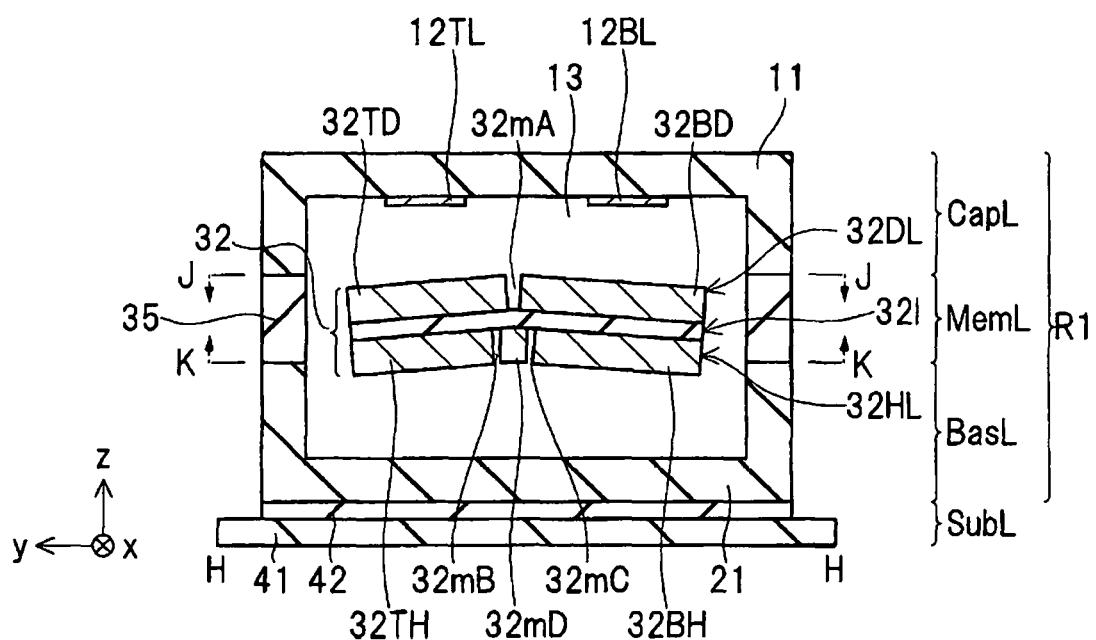
FIG. 11 is a cross-sectional view of the acceleration sensor according to the comparative example.
Figure 12:
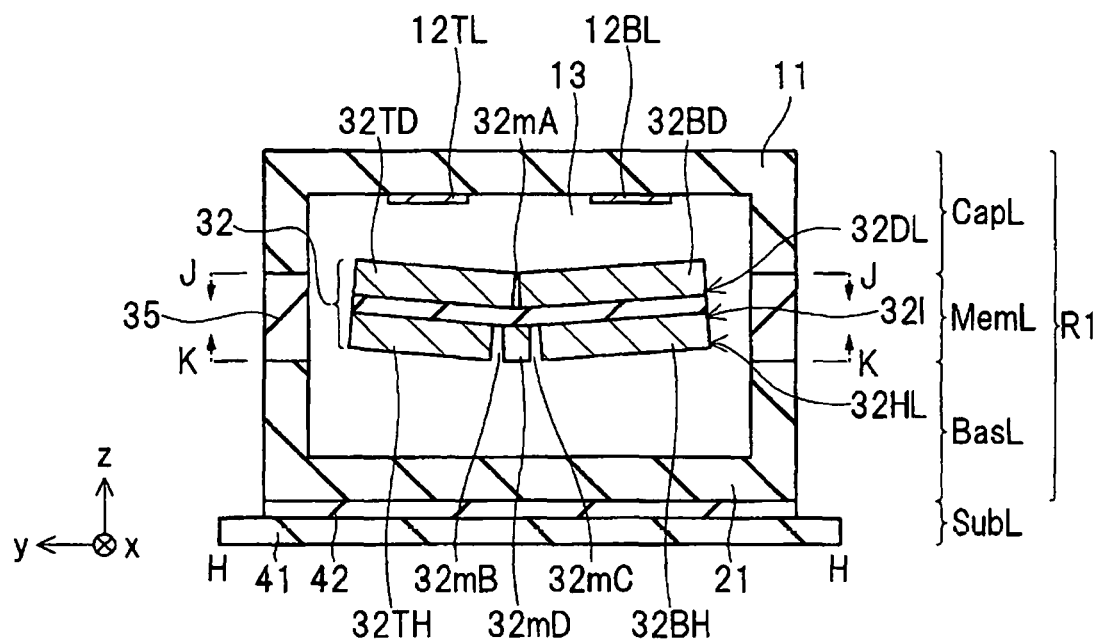
FIG. 12 is a cross-sectional view of the acceleration sensor according to the comparative example.

An acceleration sensor according to a comparative example which is examined by the inventors will be described with reference to FIGS. 9 to 12. FIG. 9 is a plan view illustrating an upper surface of a membrane layer of the acceleration sensor according to the comparative example. FIG. 10 is a plan view illustrating a lower surface of the membrane layer of the acceleration sensor according to the comparative example. FIGS. 11 and 12 are cross-sectional views of the acceleration sensor according to the comparative example.

As illustrated in FIGS. 9 and 10, in an acceleration sensor R1 according to a comparative example, a mechanical junction portion 32m linearly extends along one direction when seen in a plan view, that is, the x-axis direction, and an insulating material 32I has a small thickness of, for example, approximately 1.5 μm to 2.0 μm. For this reason, the mechanical strength of the mechanical junction portion 32m is low, and a membrane 32 is bent due to residual internal stress generated during housing (bonding of substrates), mounting, or the like. That is, a force generated in a fixed portion 34T2 and a fixed portion 34B2 causes deformation of the membrane 32 as illustrated in FIG. 11 or 12, which results in a concern that variations in a capacity value of a detection electrode are increased. Thereby, operation becomes unstable and noise is increased, and thus it is considered that it is difficult to realize the high precision acceleration sensor R1.

However, such a deterioration can be improved by forming the mechanical junction portion 32m in a non-linear shape in the x-axis direction when seen in a plan view, as in the acceleration sensor S1 according to Example 1.

The acceleration sensor S1 according to Example 1 includes the membrane 32 capable of being displaced in the z-axis direction as illustrated in FIGS. 2 to 8, and the membrane 32 includes first moving portions (moving portions 32TD and 32TH) and second moving portions (moving portions 32BD and 32BH) which are adjacent to each other in the y-axis direction with the mechanical junction portion 32m extending in the x-axis direction interposed therebetween and are electrically separated from each other. Further, the mechanical junction portion 32m extends in a direction having a first angle with respect to the x-axis direction or the y-axis direction which is perpendicular to the z-axis direction at a first location, and extends in a direction having a second angle different from the first angle with respect to the x-axis direction or the y-axis direction which is perpendicular to the z-axis direction at a second location different from the first location.

In this manner, the mechanical junction portion 32m is formed to have a non-linear shape in the x-axis direction when seen in a plan view so that the mechanical strength of the mechanical junction portion 32m is improved and the bending of the membrane 32 due to residual internal stress generated during housing, mounting, or the like is reduced.

Thereby, it is possible to suppress the deformation of the membrane 32 and to reduce variations in a capacity value of a detection electrode. As a result, operation is stabilized and noise is reduced, and thus it is possible to provide the high precision acceleration sensor S1.

Modification Example of Example 1

1. Modification Example 1 of Example 1

The mechanical junction portion 32m included in the acceleration sensor S1 according to Example 1 includes one gap 32mA provided in the conductive layer 32DL and two gaps 32mB and 32mC provided in the conductive layer 32HL.

The mechanical junction portion 32m provides DC electrical isolation between the moving portions 32TD and 32BD which are variable capacitors, and the number of gaps provided in the conductive layer 32HL may be one. However, in order to improve the AC electrical isolation, it is preferable to install two or more gaps of at least one of the conductive layers 32DL and 32HL and to install one or more conductive layers (for example, the conductive material 32mD) which float electrically. Thereby, this leads to the provision of the high precision acceleration sensor.

2. Modification Example 2 and Modification Example 3 of Example 1

The shape of the mechanical junction portion 32m included in the acceleration sensor S1 according to Example 1 when seen in a plan view is not limited to the shapes illustrated in FIGS. 5 and 6.

Figure 13:
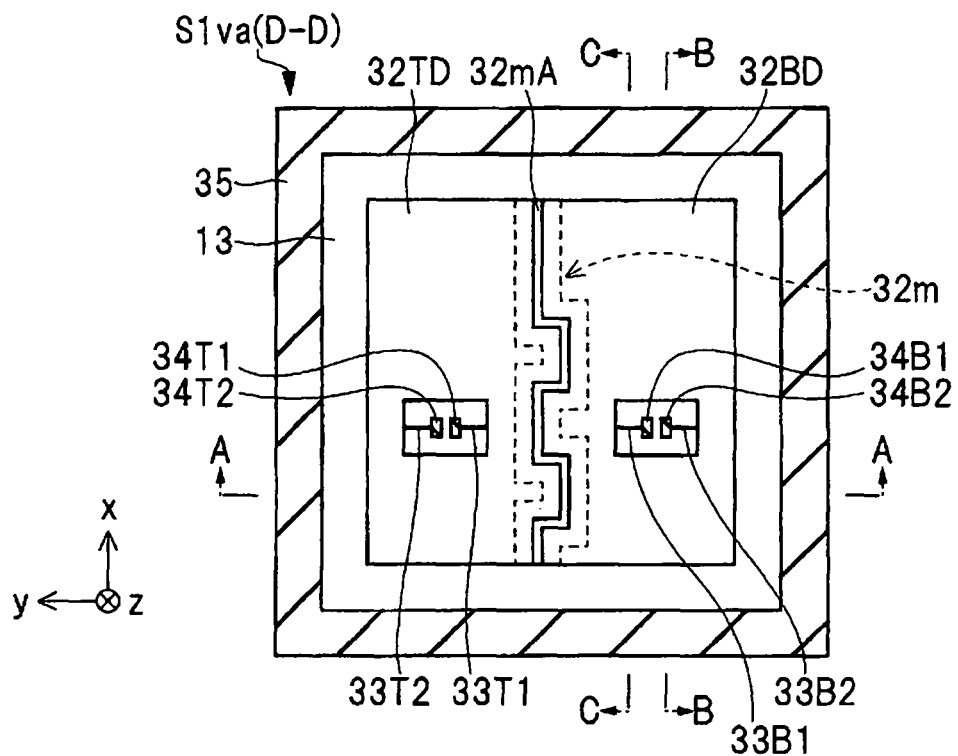
FIG. 13 is a plan view illustrating an upper surface of a membrane layer of an acceleration sensor according to Modification Example 2 of Example 1.
Figure 14:
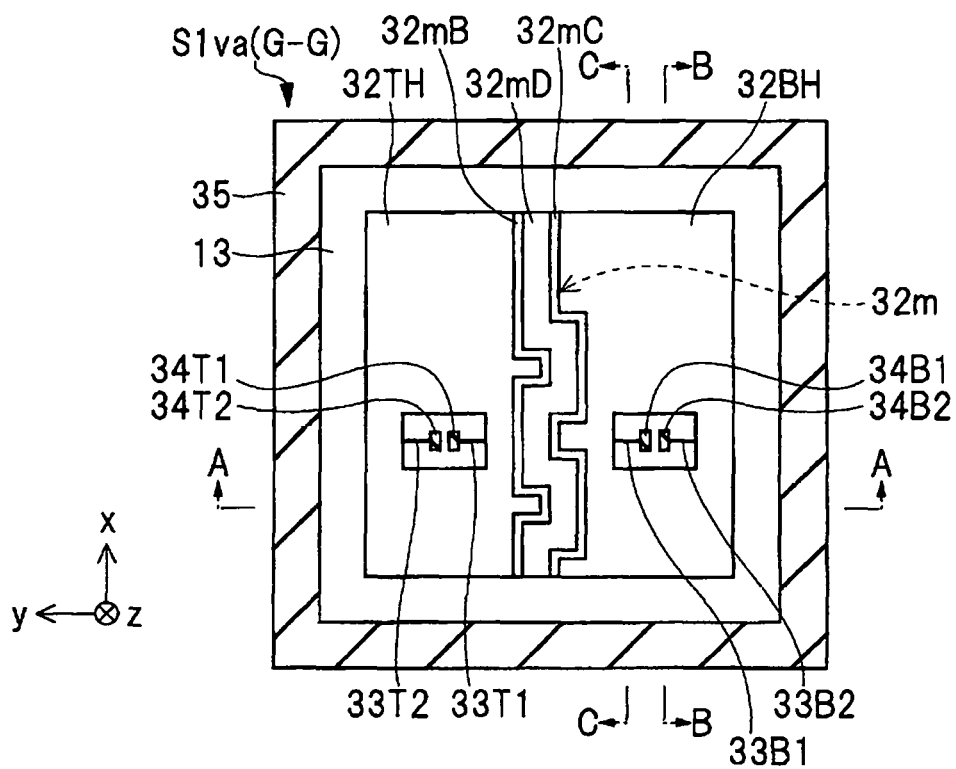
FIG. 14 is a plan view illustrating a lower surface of the membrane layer of the acceleration sensor according to Modification Example 2 of Example 1.

For example, gaps 32mA, 32mB, and 32mC may be formed to have a shape in which a portion extending in the x-axis direction and a portion extending in the y-axis direction are alternately connected to each other, as in an acceleration sensor S1va according to Modification Example 2 illustrated in FIGS. 13 and 14. Thereby, the shape of the mechanical junction portion 32m when seen in a plan view is a so-called meander shape in which a portion extending in the x-axis direction and a portion extending in the y-axis direction are alternately connected to each other, and thus the mechanical strength of the mechanical junction portion 32m is improved.

In addition, at least one gap of the gaps 32mA, 32mB, and 32mC may be formed to have a non-linear shape and the others may be formed to have a linear shape in the x-axis direction when seen in a plan view, and thus the mechanical strength of the mechanical junction portion 32m is improved.

Figure 15:
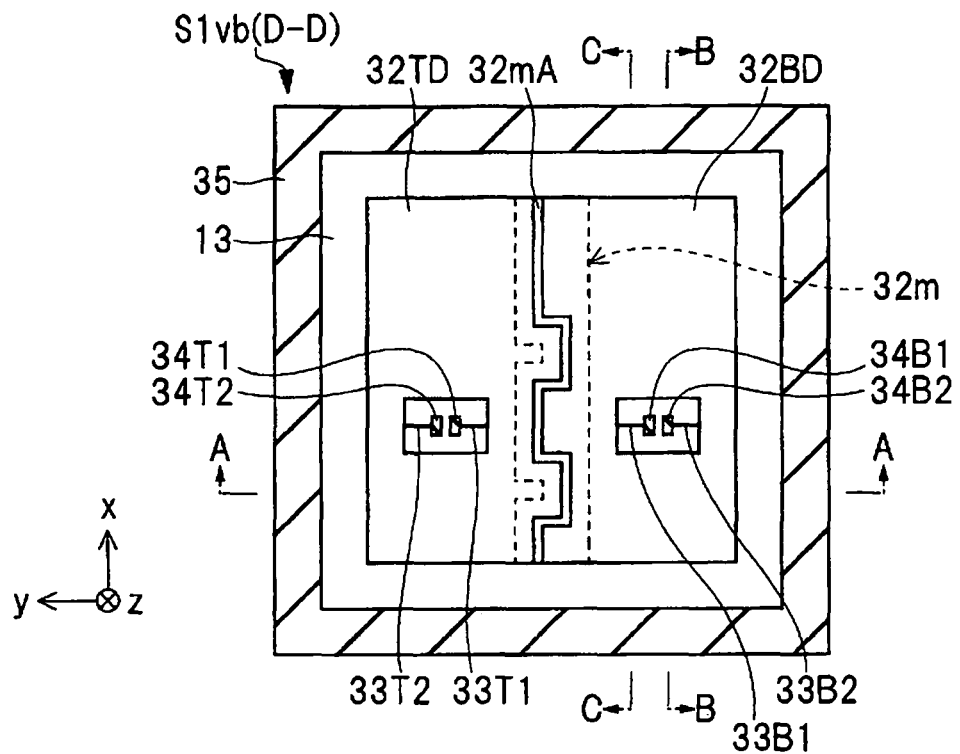
FIG. 15 is a plan view illustrating an upper surface of a membrane layer of an acceleration sensor according to Modification Example 3 of Example 1.
Figure 16:
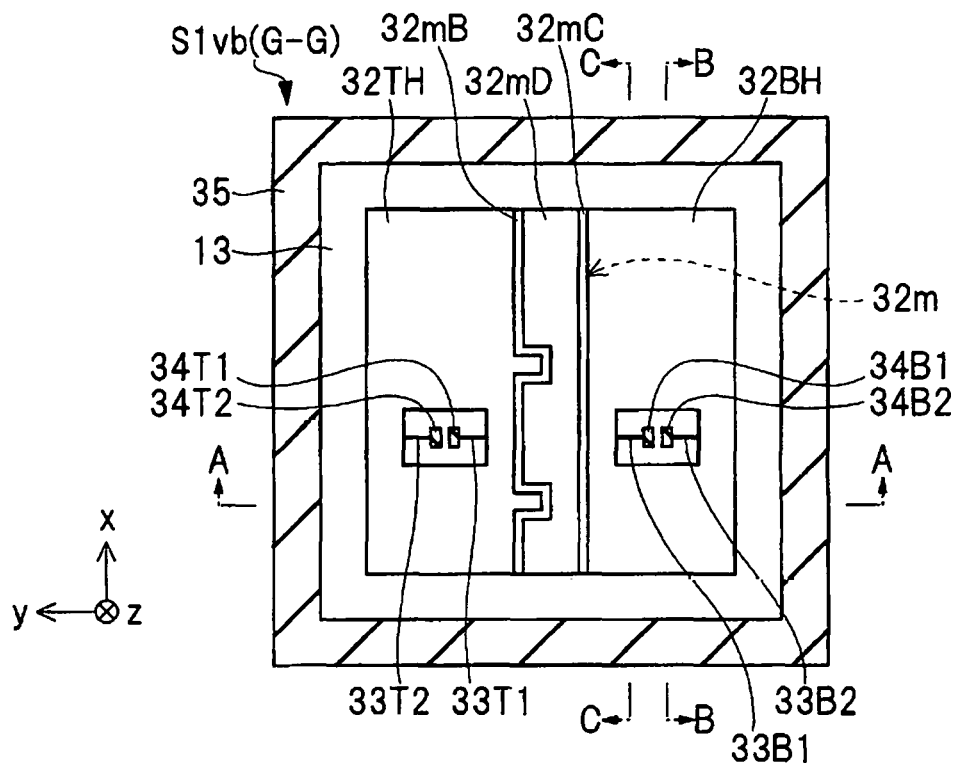
FIG. 16 is a plan view illustrating a lower surface of the membrane layer of the acceleration sensor according to Modification Example 3 of Example 1.
Figure 17A:
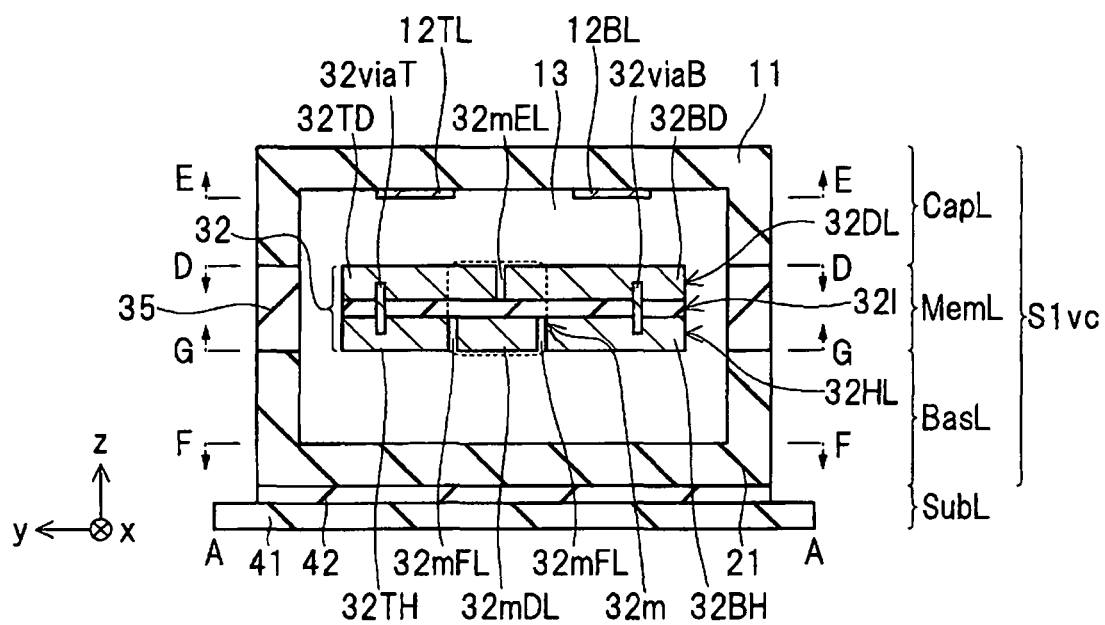
FIG. 17A is a cross-sectional view of an acceleration sensor according to Modification Example 4 of Example 1.
Figure 17B:
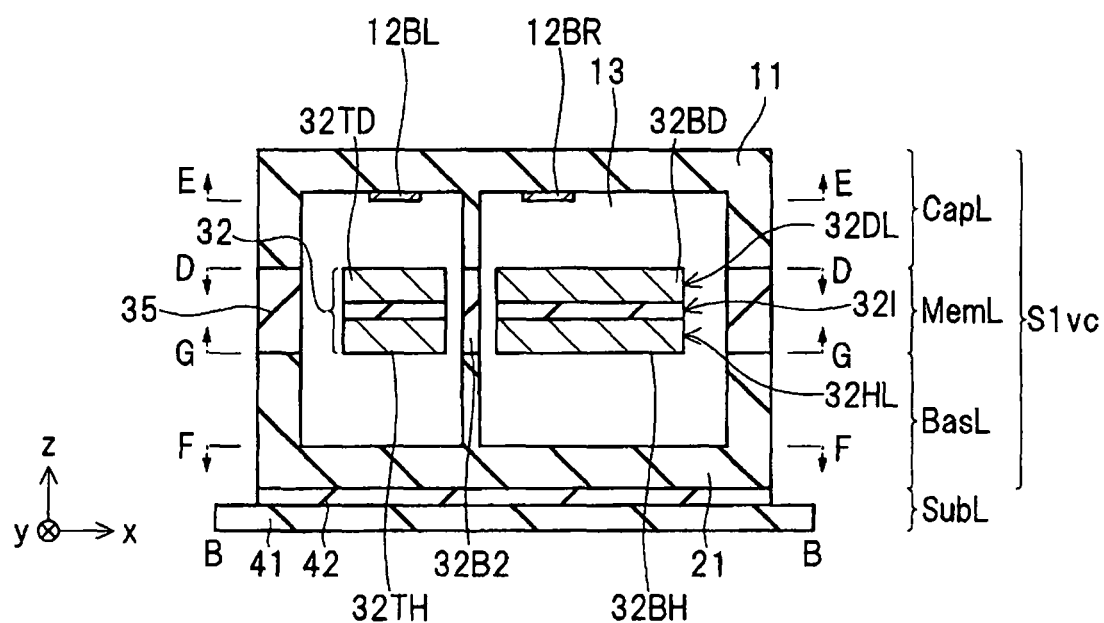
FIG. 17B is a cross-sectional view of the acceleration sensor according to Modification Example 4 of Example 1.
Figure 17C:
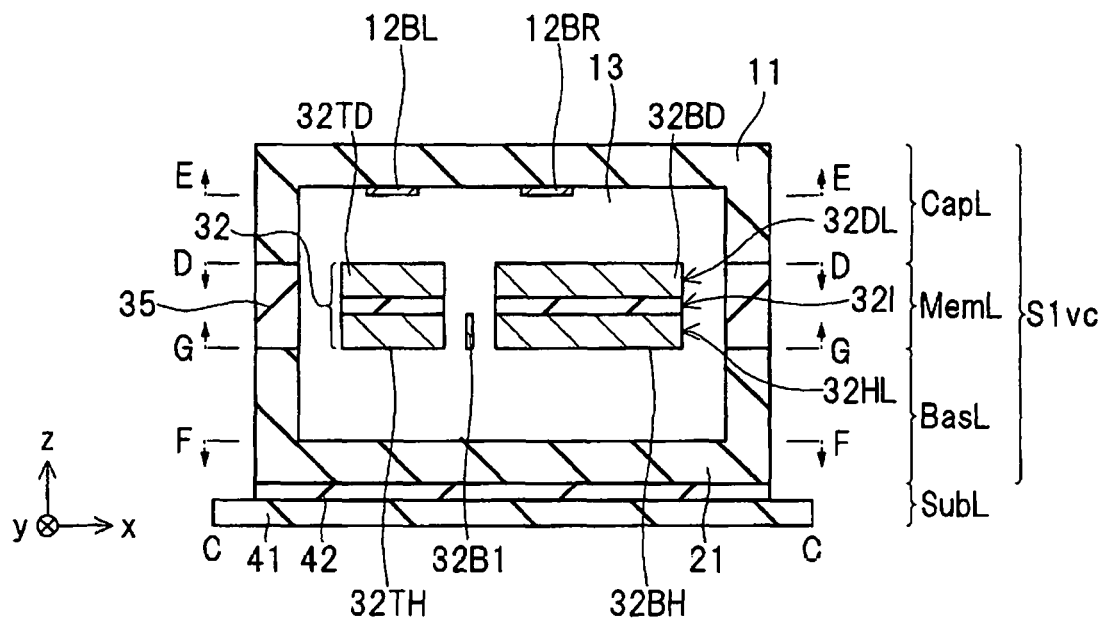
FIG. 17C is a cross-sectional view of the acceleration sensor according to Modification Example 4 of Example 1.
Figure 18A:
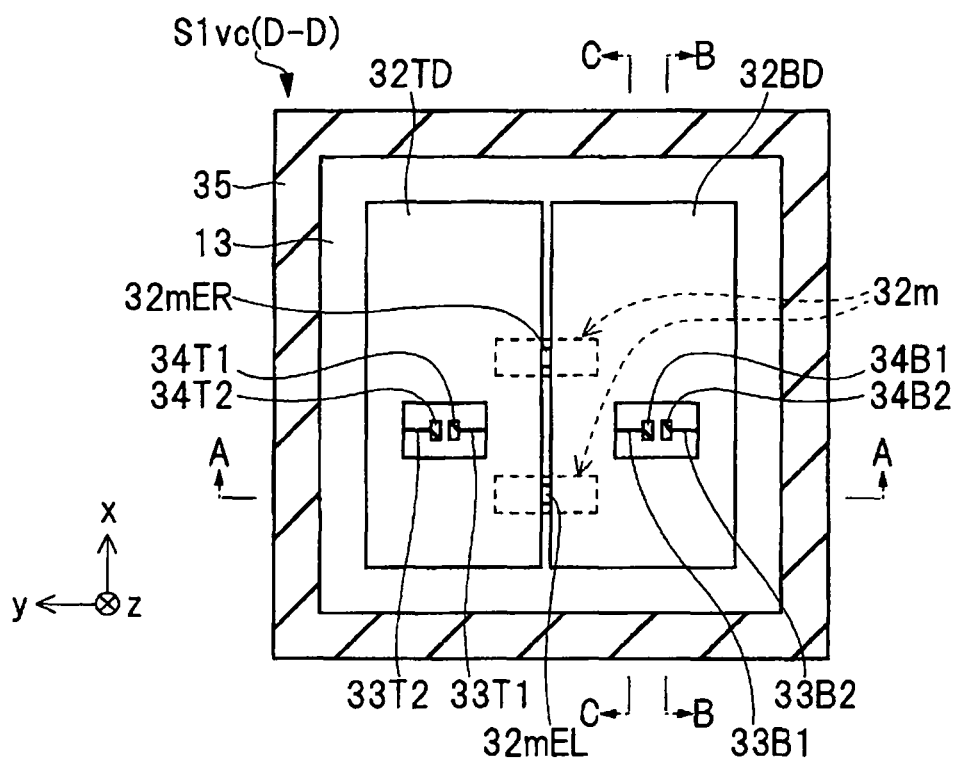
FIG. 18A is a plan view illustrating an upper surface of a membrane layer of the acceleration sensor according to Modification Example 4 of Example 1.
Figure 18B:
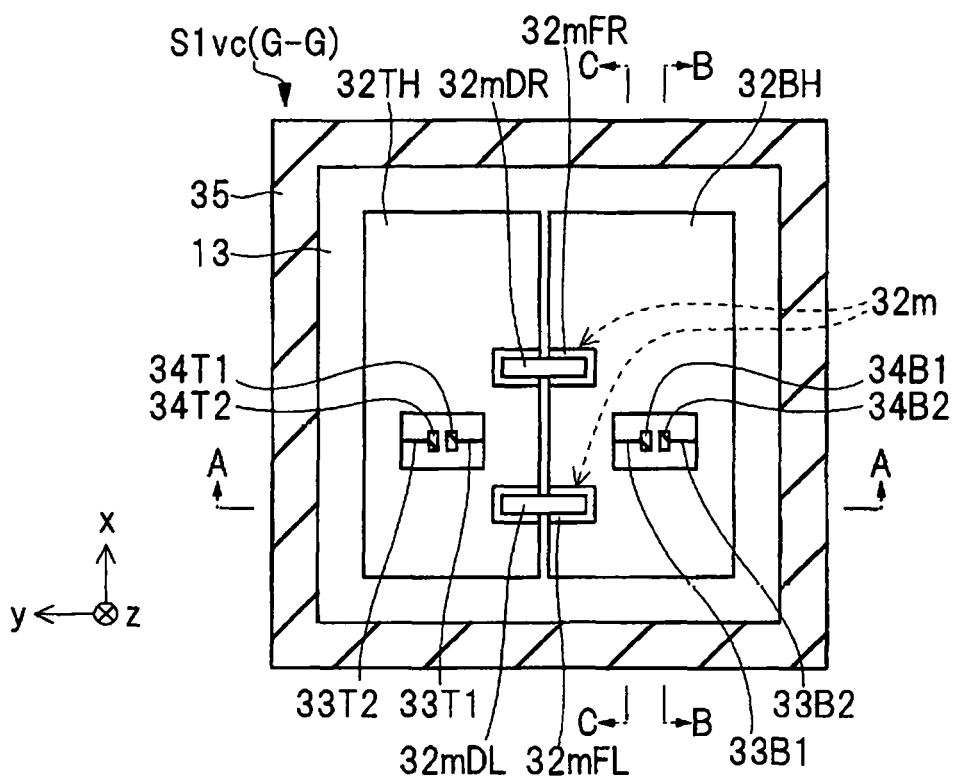
FIG. 18B is a plan view illustrating a lower surface of the membrane layer of the acceleration sensor according to Modification Example 4 of Example 1.

For example, the gaps 32mA and 32mB may be formed to have a shape in which a portion extending in the x-axis direction and a portion extending in the y-axis direction are alternately connected to each other and the gap 32mC may be formed to have a shape which linearly extends in the x-axis direction, as in an acceleration sensor S1vb according to Modification Example 3 illustrated in FIGS. 15 and 16.

3. Modification Example 4 of Example 1

In the acceleration sensor S1 according to Modification Example 1, the mechanical junction portion 32m is formed from one end to the other end of the membrane 32 in the x-axis direction, and the length of the membrane 32 and the length of the mechanical junction portion 32m in the x-axis direction are the same as each other. However, the mechanical junction portion 32m may be formed in a portion of the membrane 32 in the x-axis direction.

For example, one or a plurality of mechanical junction portions 32m each having a length shorter than the length of a membrane 32 in the x-axis direction may be disposed between a moving portion 32TH and a moving portion 32BH, as in an acceleration sensor S1vc according to Modification Example 4 illustrated in FIGS. 17A to 18B. In the acceleration sensor S1vc, two mechanical junction portions 32m are illustrated. Conductive materials 32mDL and 32mDR constituting the mechanical junction portion 32m may have a shape which is long in the y-axis direction and is short in the x-axis direction.

The conductive material 32mDL is surrounded by a gap 32mFL, and the gap 32mFL functions as an insulator that DC-electrically insulates the moving portion 32TH and the conductive material 32mDL from each other and functions as an insulator that DC-electrically insulates the moving portion 32BH and the conductive material 32mDL from each other. In addition, the conductive material 32mDR is surrounded by a gap 32mFR, and the gap 32mFR functions as an insulator that DC-electrically insulates the moving portion 32TH and the conductive material 32mDR from each other and functions as an insulator that DC-electrically insulates the moving portion 32BH and the conductive material 32mDR from each other.

Further, a side surface of the moving portion 32TD which faces the moving portion 32BD extends linearly along the x-axis direction, and a side surface of the moving portion 32BD which faces the moving portion 32TD extends linearly along the x-axis direction. Linear gaps 32mEL and 32mER are formed between the moving portion 32TD and the moving portion 32BD and right on the conductive materials 32mDL and 32mDR through an insulating material 32I.

The conductive materials 32mDL and 32mDR that DC-electrically float are formed to have a shape which is long in the y-axis direction and is short in the x-axis direction, and thus the mechanical strength of the mechanical junction portion 32m is increased. Further, contact areas between the conductive materials 32mDL and 32mDR and the insulating material 32I are reduced, and thus AC electrical isolation of the moving portions 32TD and 32BD which are variable capacitors is improved.

In this manner, the mechanical junction portion 32m is formed to have a non-linear shape in the x-axis direction when seen in a plan view and a plurality of mechanical junction portions 32m are provided, so that the deformation of the membrane 32 is suppressed, which leads to the provision of the high precision acceleration sensor.

Meanwhile, portions other than portions between the moving portion 32TD and the moving portion 32BD, between the moving portion 32TH and the moving portion 32BH, and right on the conductive materials 32mDL and 32mDR are not mechanically joined to each other because the insulating material 32I is not formed therein, and thus the portions does not correspond to the mechanical junction portion 32m.

4. Modification Example 5 and Modification Example 6 of Example 1

The acceleration sensor S1 according to Example 1 includes four variable capacitors. The variable capacitors are electrically connected to each other, for example, as disclosed in FIGS. 1 to 3 of JP-A-2016-070817, and thus it is possible to detect acceleration with a high level of accuracy.

Figure 19:
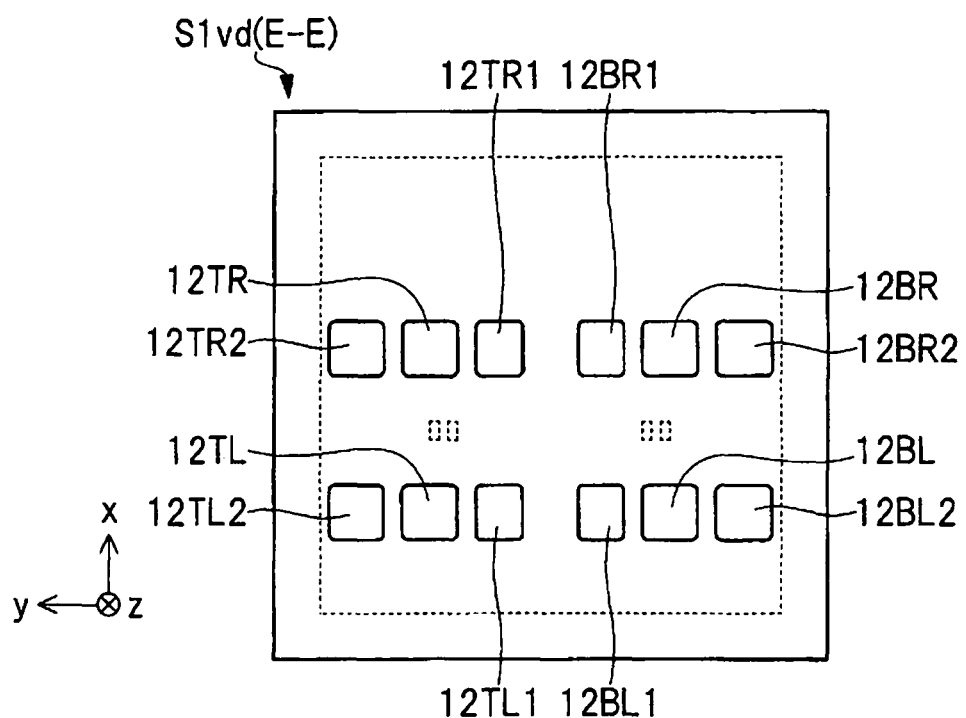
FIG. 19 is a plan view illustrating a lower surface of a cap layer of an acceleration sensor according to Modification Example 5 of Example 1.

For example, in a case where application to a servo control type acceleration sensor is made as in the acceleration sensor S1vd according to Modification Example 5 illustrated in FIG. 19, fixation electrodes for DC servo 12TL1, 12TR1, 12BL1, and 12BR1 and fixation electrodes for AC servo 12TL2, 12TR2, 12BL2, and 12BR2 may be added to the acceleration sensor S1 according to Example 1 described above. Thereby, this leads to the provision of the acceleration sensor capable of achieving power saving and low noise.

Figure 20:
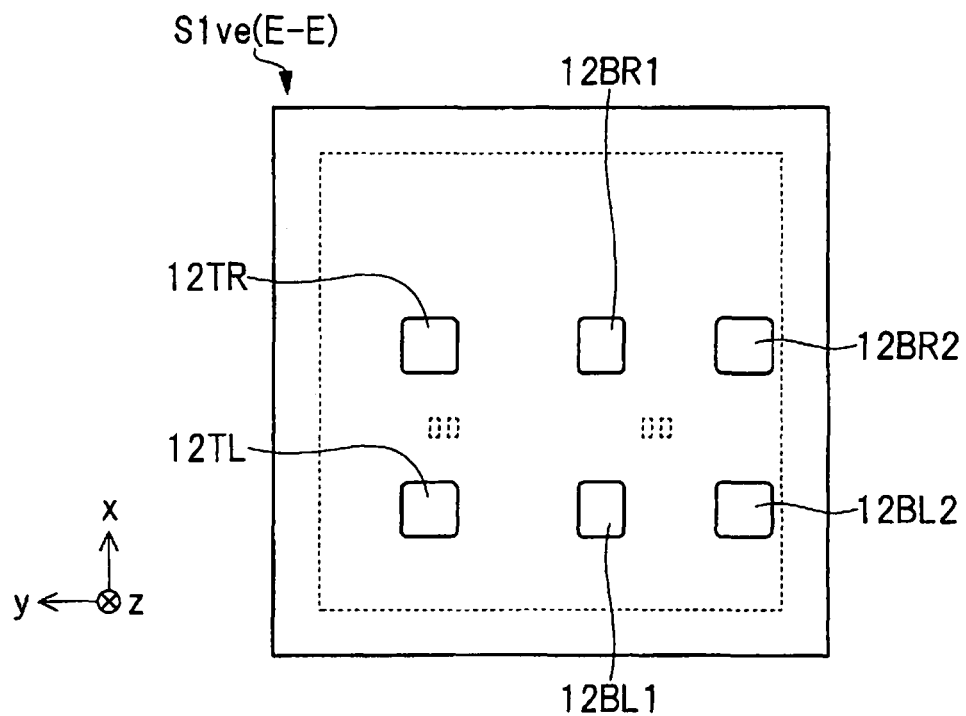
FIG. 20 is a plan view illustrating a lower surface of a cap layer of an acceleration sensor according to Modification Example 6 of Example 1.

In addition, for example, as in an acceleration sensor S1ve according to Modification Example 6 illustrated in FIG. 20, fixation electrodes 12TL and 12TR for signal detection may be installed on one side of the mechanical junction portion 32m (for example, see FIG. 2), and fixation electrodes for DC servo 12BL1 and 12BR1 and fixation electrodes for AC servo 12BL2 and 12BR2 may be installed on a side opposite to the fixation electrodes 12TL and 12TR with the mechanical junction portion 32m (for example, see FIG. 2) interposed therebetween. A moving portion 32BD (for example, see FIG. 5) that faces the fixation electrodes for DC servo 12BL1 and 12BR1 and the fixation electrodes for AC servo 12BL2 and 12BR2 are electrically grounded.

Thereby, it is possible to suppress the amount of leakage of a servo signal, flowing to the fixation electrodes for DC servo 12BL1 and 12BR1 and the fixation electrodes for AC servo 12BL2 and 12BR2, to a charge amplifier. In addition, the rate of change of a variable capacitor for actual signal detection due to servo electrode capacitance not being viewed from an input terminal of the charge amplifier is increased, which leads to the provision of the acceleration sensor capable of achieving power saving and low noise.

Example 2

A configuration of an acceleration sensor according to Example 2 will be described with reference to the accompanying drawings, focusing on differences from the acceleration sensor according to Example 1 described above.

Configuration of Acceleration Sensor

Figure 21:
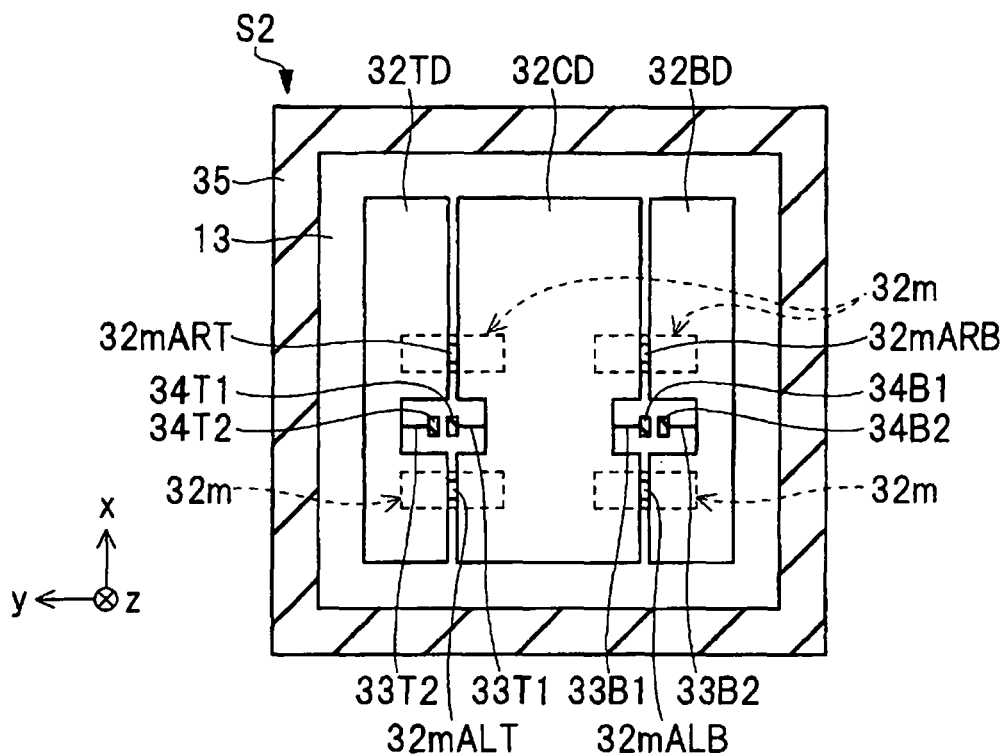
FIG. 21 is a plan view illustrating an upper surface of a membrane layer of an acceleration sensor according to Example 2.
Figure 22:
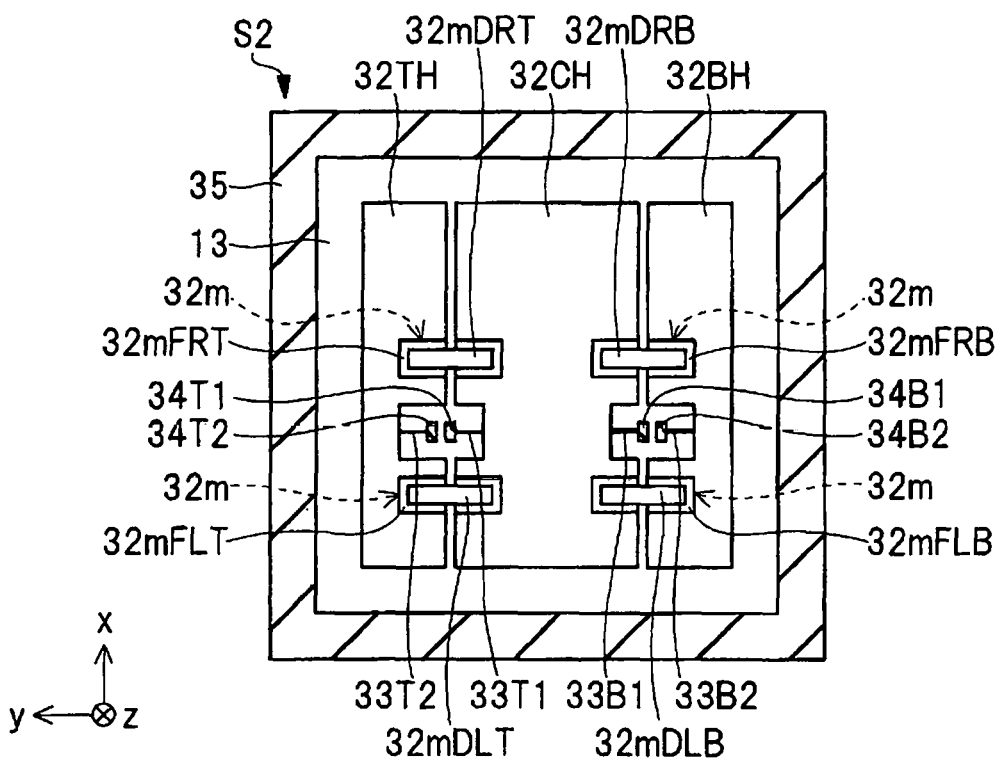
FIG. 22 is a plan view illustrating a lower surface of the membrane layer of the acceleration sensor according to Example 2.
Figure 23:
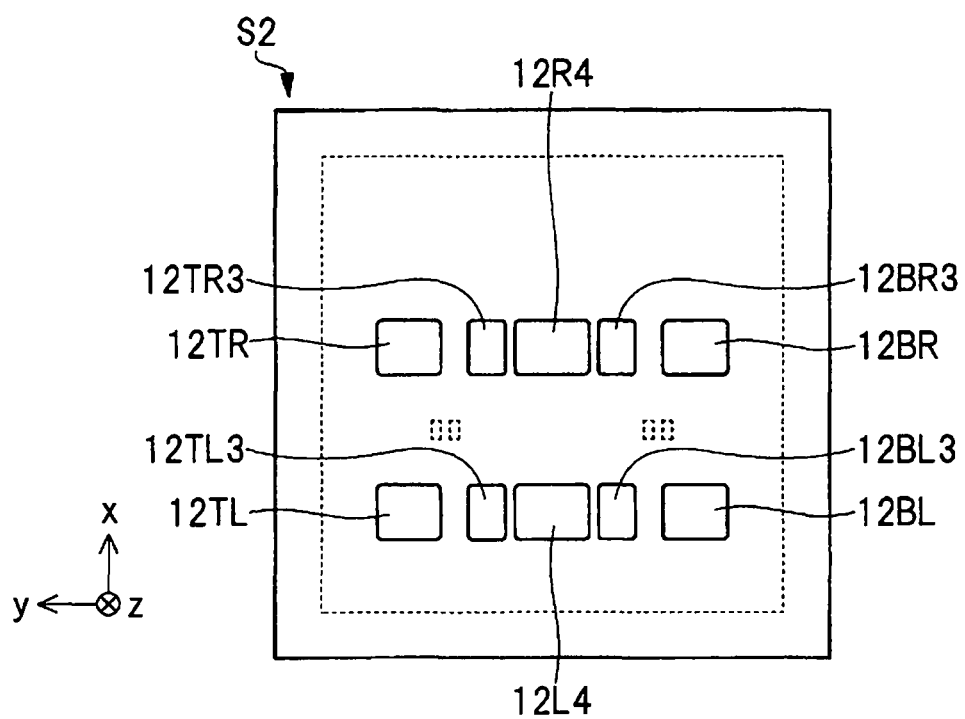
FIG. 23 is a plan view illustrating a lower surface of a cap layer of the acceleration sensor according to Example 2.

A configuration of the acceleration sensor according to Example 2 will be described with reference to FIGS. 21 to 23. FIG. 21 is a plan view illustrating an upper surface of a membrane layer of the acceleration sensor according to Example 2 (equivalent to FIG. 5 used for the description of the acceleration sensor S1 according to Example 1 described above). FIG. 22 is a plan view illustrating a lower surface of the membrane layer of the acceleration sensor according to Example 2 (equivalent to FIG. 6 used for the description of the acceleration sensor S1 according to Example 1 described above). FIG. 23 is a plan view illustrating a lower surface of a cap layer of the acceleration sensor according to Example 2 (equivalent to FIG. 7 used for the description of the acceleration sensor S1 according to Example 1 described above).

As illustrated in FIGS. 21 and 22, the shape of a mechanical junction portion 32m constituting an acceleration sensor S2 according to Example 2 is the same as the shape of the mechanical junction portion 32m constituting the acceleration sensor S1vc according to Modification Example 4 of Example 1 described above. However, in the acceleration sensor S2 according to Example 2, two rows (four) of mechanical junction portions 32m are installed, and a membrane 32 is DC-electrically divided into three parts. That is, three moving portions (moving electrode) 32TD, 32CD, and 32BD are disposed.

Therefore, a conductive material 32mDLT is disposed between a moving portion 32TH and a moving portion 32CH so as to be surrounded by a gap 32mFLT, and a conductive material 32mDRT is disposed therebetween so as to be surrounded by a gap 32mFRT. In addition, a conductive material 32mDLB is disposed between the moving portion 32CH and a moving portion 32BH so as to be surrounded by a gap 32mFLB, and a conductive material 32mDRB is disposed therebetween so as to be surrounded by a gap 32mFRB.

As illustrated in FIG. 23, in addition to fixation electrodes 12TL, 12TR, 12BL, and 12BR, fixation electrodes for servo control 12TL3, 12TR3, 12BL3, 12BR3, 12L4, and 12R4 are installed in the acceleration sensor S2. A moving portion 32TD facing the fixation electrodes 12TL and 12TR, a moving portion 32BD facing the fixation electrodes 12BL and 12BR, and a moving portion 32CD facing the fixation electrodes for servo control 12TL3, 12TR3, 12BL3, 12BR3, 12L4, and 12R4 are DC-electrically insulated from each other and are mechanically connected to each other by the mechanical junction portion 32m.

In addition, the fixation electrodes for servo control 12TL3 and 12BL3 are electrically connected to each other. Further, the fixation electrodes for servo control 12TR3 and 12BR3 are electrically connected to each other. These fixation electrodes are disposed so as to be symmetrical to the x-axis direction of the acceleration sensor S2 (the right side and the left side of the paper) and are separated from each other, but are electrically connected to each other to function as one fixation electrode. These fixation electrodes function as right fixation electrodes being a capacitor pair for DC servo control and left fixation electrodes being a capacitor pair for DC servo control which are illustrated in FIG. 1 of JP-A-2016-070817.

In addition, the moving portion 32CD facing the fixation electrodes for servo control 12TL3, 12TR3, 12BL3, 12BR3, 12L4, and 12R4 is electrically grounded.

Although not shown in the drawing, the moving portion 32TD is DC-electrically connected to the moving portion 32TH in the acceleration sensor S2, similar to the acceleration sensor S1 according to Example 1 described above. In addition, the moving portion 32BD is DC-electrically connected to the moving portion 32BH. Further, in the acceleration sensor S2, the moving portion 32CD is DC-electrically connected to the moving portion 32CH. Thereby, it is possible to lower the electric resistance of the moving electrode.

In addition, the conductive materials 32mDLT, 32mDRT, 32mDLB, and 32mDRB DC-electrically float. Thereby, AC electrical isolation between the moving portion 32TD and the moving portion 32BD is improved.

In this manner, in the acceleration sensor S2 according to Example 2, the mechanical junction portion 32m has a non-linear shape in the x-axis direction when seen in a plan view. Accordingly, although two rows (four) of mechanical junction portions 32m are installed, it is possible to reduce variations in a capacity value, similar to the acceleration sensor S1 according to Example 1 described above. Thereby, operation is stabilized and noise is reduced, and thus it is possible to provide the high precision acceleration sensor S2. Further, this leads to the provision of the acceleration sensor capable of achieving power saving and low noise.

Modification Example of Example 2

In the acceleration sensor S2 according to Example 2, the mechanical junction portion 32m is disposed so as to face the fixation electrodes 12TL, 12TR, 12BL, and 12BR, but the arrangement of the mechanical junction portion 32m is not limited thereto.

Figure 24:
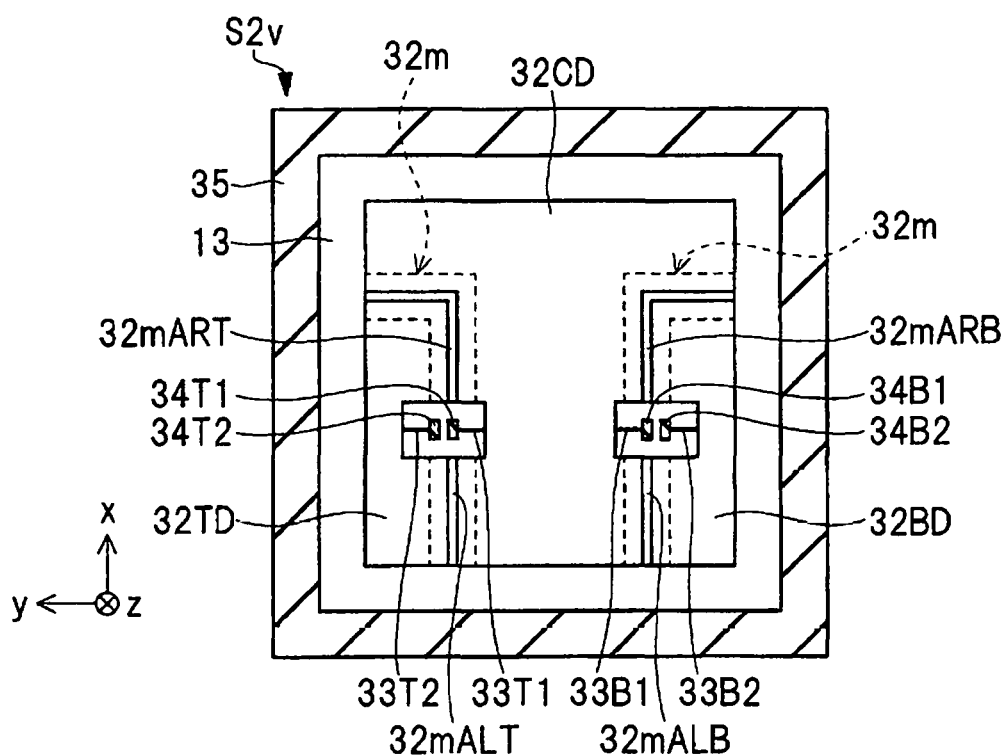
FIG. 24 is a plan view illustrating an upper surface of a membrane layer of an acceleration sensor according to a modification example of Example 2.
Figure 25:
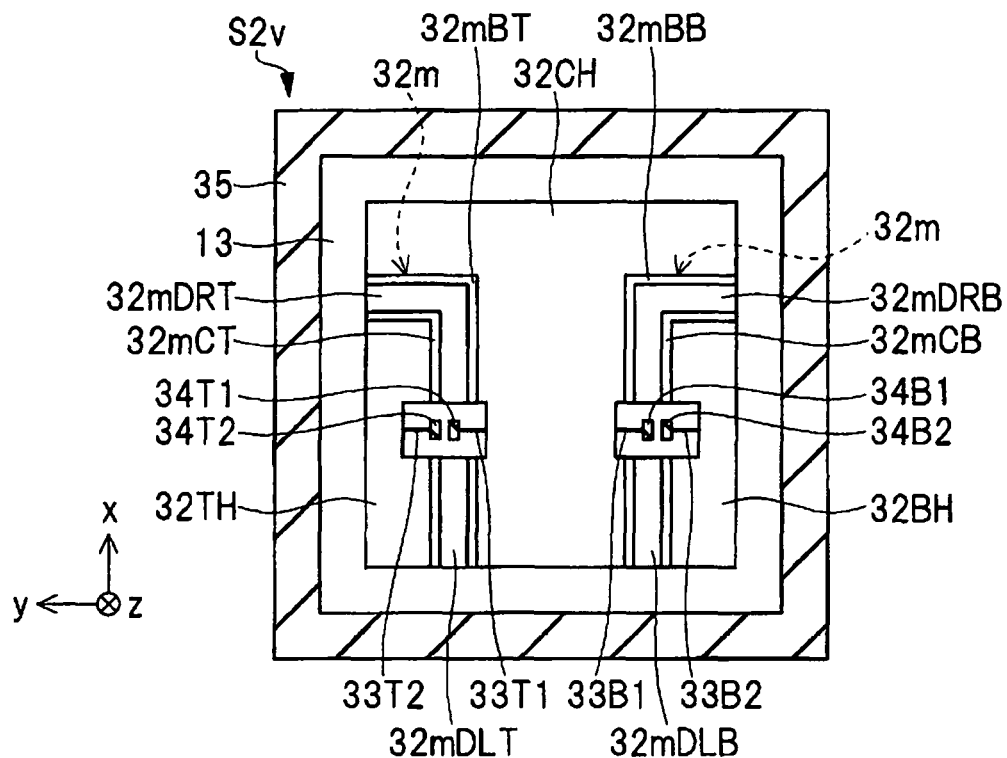
FIG. 25 is a plan view illustrating a lower surface of the membrane layer of the acceleration sensor according to the modification example of Example 2.

For example, as in an acceleration sensor S2v according to a modification example illustrated FIGS. 24 and 25, when a cap layer CapL and a membrane layer MemL are viewed from above in an overlapping manner (for example, see FIG. 2), two mechanical junction portions 32m may be disposed so as to respectively surround the fixation electrodes 12TL and 12TR and the fixation electrodes 12BL and 12BR.

Specifically, one mechanical junction portion 32m includes a portion extending in the x-axis direction and a portion extending in the y-axis direction toward one outside (the left side of the paper) of the membrane 32 from one end of the portion extending in the x-axis direction, and includes two gaps 32mBT and 32mCT having an L-shape and disposed so as to be separated from each other and conductive materials 32mDLT and 32mDRT interposed between the gap 32mBT and the gap 32mCT. The other mechanical junction portion 32m includes a portion extending in the x-axis direction and a portion extending in the y-axis direction toward the other outside (the right side of the paper) of the membrane 32 from one end of the portion extending in the x-axis direction, and includes two gaps 32mBB and 32mCB having an L-shape and disposed so as to be separated from each other and conductive materials 32mDLB and 32mDRB interposed between the gap 32mBB and the gap 32mCB.

Gaps 32mALT and 32mART are formed right on the conductive materials 32mDLT and 32mDRT through an insulating material 32I (for example, see FIG. 2), and gaps 32mALB and 32mARB are formed right on the conductive materials 32mDLB and 32mDRB through the insulating material 32I (for example, see FIG. 2).

In this manner, even in the acceleration sensor S2v according to the modification example of Example 2, the mechanical junction portion 32m has a non-linear shape in the x-axis direction when seen in a plan view. Accordingly, although two mechanical junction portions 32m are installed, there are the same effects as those in the acceleration sensor S2 according to Example 2 described above. Further, areas of the moving portions 32TD and 32BD facing the fixation electrodes 12TL, 12TR, 12BL, and 12BR connected to an input terminal of a charge amplifier are reduced, and it is possible to reduce the ground parasitic capacitance of the moving portions 32TD and 32BD, which leads to the provision of the acceleration sensor with low noise.

Example 3

A configuration of an acceleration sensor according to Example 3 will be described with reference to the accompanying drawings, focusing on differences from the acceleration sensor according to Example 2 described above.

Configuration of Acceleration Sensor

Figure 26:
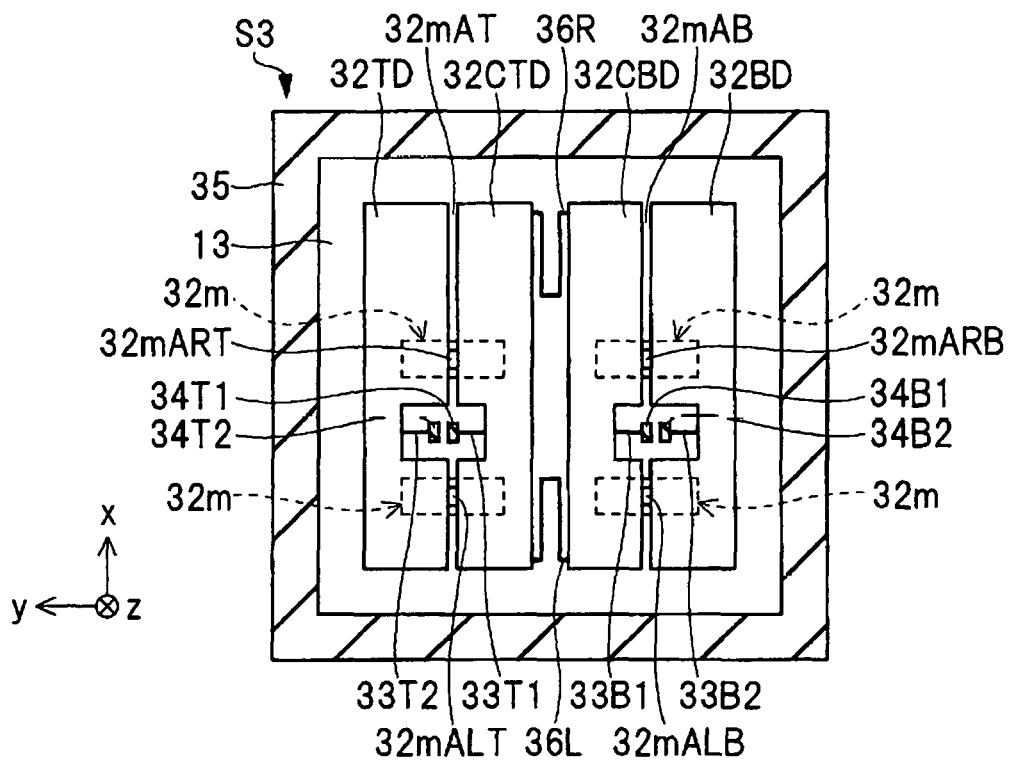
FIG. 26 is a plan view illustrating an upper surface of a membrane layer of an acceleration sensor according to Example 3.
Figure 27:
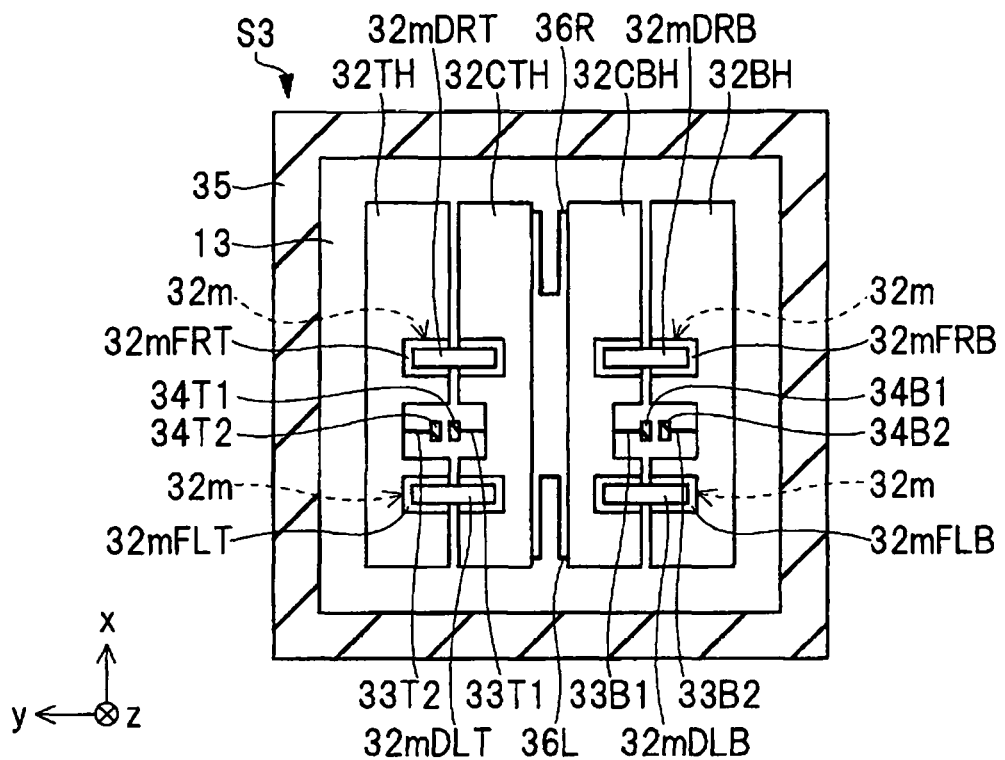
FIG. 27 is a plan view illustrating a lower surface of the membrane layer of the acceleration sensor according to Example 3.
Figure 28:
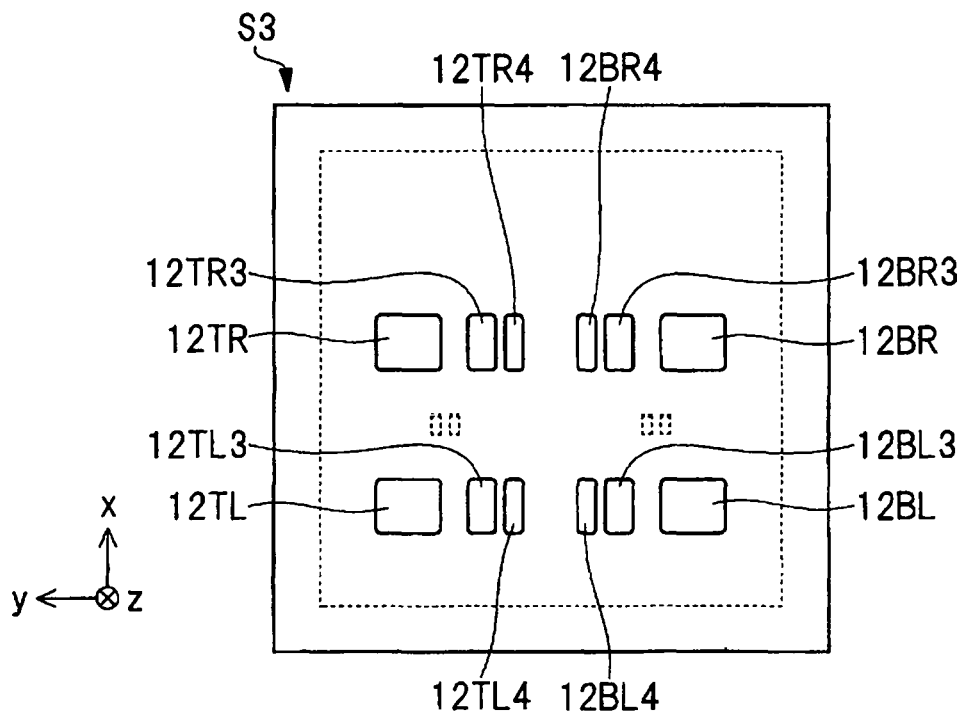
FIG. 28 is a plan view illustrating a lower surface of a cap layer of the acceleration sensor according to Example 3.

A configuration of the acceleration sensor according to Example 3 will be described with reference to FIGS. 26 to 28. FIG. 26 is a plan view illustrating an upper surface of a membrane layer of the acceleration sensor according to Example 3 (equivalent to FIG. 21 used for the description of the acceleration sensor S2 according to Example 2 described above). FIG. 27 is a plan view illustrating a lower surface of the membrane layer of the acceleration sensor according to Example (equivalent to FIG. 22 used for the description of the acceleration sensor S2 according to Example 2 described above). FIG. 28 is a plan view illustrating a lower surface of a cap layer of the acceleration sensor according to Example 3 (equivalent to FIG. 23 used for the description of the acceleration sensor S2 according to Example 2 described above).

The shape of a mechanical junction portion 32m of the acceleration sensor according to Example 3 and the number of mechanical junction portions 32m are the same as those of the mechanical junction portion 32m of the acceleration sensor S2 according to Example 2 described above. However, in an acceleration sensor S3 according to Example 3, a moving portion 32CD of the acceleration sensor S2 according to Example 2 described above is divided into moving portions 32CTD and 32CBD, and a moving portion 32CH of the acceleration sensor S2 according to Example 2 described above is divided into moving portions 32CTH and 32CBH. The moving portions 32CTD and 32CTH and the moving portions 32CBD and 32CBH are mechanically and DC-electrically connected to each other by bending springs 36L and 36R formed using the conductive layer 32HL (for example, see FIG. 2).

Although not shown in the drawing, a moving portion 32TD is DC-electrically connected to a moving portion 32TH in the acceleration sensor S3, similar to the acceleration sensor S2 according to Example 2 described above. In addition, a moving portion 32BD is DC-electrically connected to a moving portion 32BH. Further, in the acceleration sensor S3, the moving portion 32CTD is DC-electrically connected to the moving portion 32CTH. Similarly, the moving portion 32CBD is DC-electrically connected to the moving portion 32CBH. Thereby, it is possible to lower the electric resistance of the moving electrode.

In addition, conductive materials 32mDLT, 32mDRT, 32mDLB, and 32mDRB DC-electrically float. Thereby, AC electrical isolation between the moving portion 32TD and the moving portion 32CTD and between the moving portion 32CBD and the moving portion 32BD is improved.

Each of the bending springs 36L and 36R has a shape which is thin in the xy plane, has a thick plate shape in the z-axis direction, and has a so-called meander shape within the xy plane. For this reason, the moving portion 32CTD and the moving portion 32CBD which are mechanically connected to each other through the bending springs 36L and 36R may be integrated with each other in the z-axis direction and may be operated relatively in the y-axis direction. Thereby, a force applied to a membrane 32 through fixed portions 34T2 and 34B2 (for example, see FIG. 2) by a cap layer CapL, abase layer BasL, and a mounting substrate layer SubL is opened.

Since the bending springs 36L and 36R are formed using the conductive layer 32HL (for example, see FIG. 2), the moving portions 32CTD and 32CTH, the bending springs 36L and 36R, and the moving portions 32CBD and 32CBH are DC-electrically connected to each other.

In this manner, in the acceleration sensor S3 according to Example 3, since the mechanical junction portion 32m has a non-linear shape in the x-axis direction when seen in a plan view, it is possible to reduce bending of the mechanical junction portion 32m similar to the acceleration sensor S2 according to Example 2 described above, and thus it is possible to reduce variations in a capacity value. Further, since a deformation force applied to the membrane 32 by the bending springs 36L and 36R is opened, it is also possible to reduce variations in a capacity value. Thereby, operation is stabilized and noise is reduced, and thus it is possible to provide the high precision acceleration sensor S3. Further, this leads to the provision of the acceleration sensor S3 capable of achieving power saving and low noise.

Modification Example of Example 3

In the acceleration sensor S3 according to Example 3 described above, the bending springs 36L and 36R are disposed between the moving portions 32CTD and 32CTH and the moving portions 32CBD and 32CBH, but the arrangement of the bending springs 36L and 36R is not limited thereto.

1. Modification Example 1 of Example 3

Figure 29:
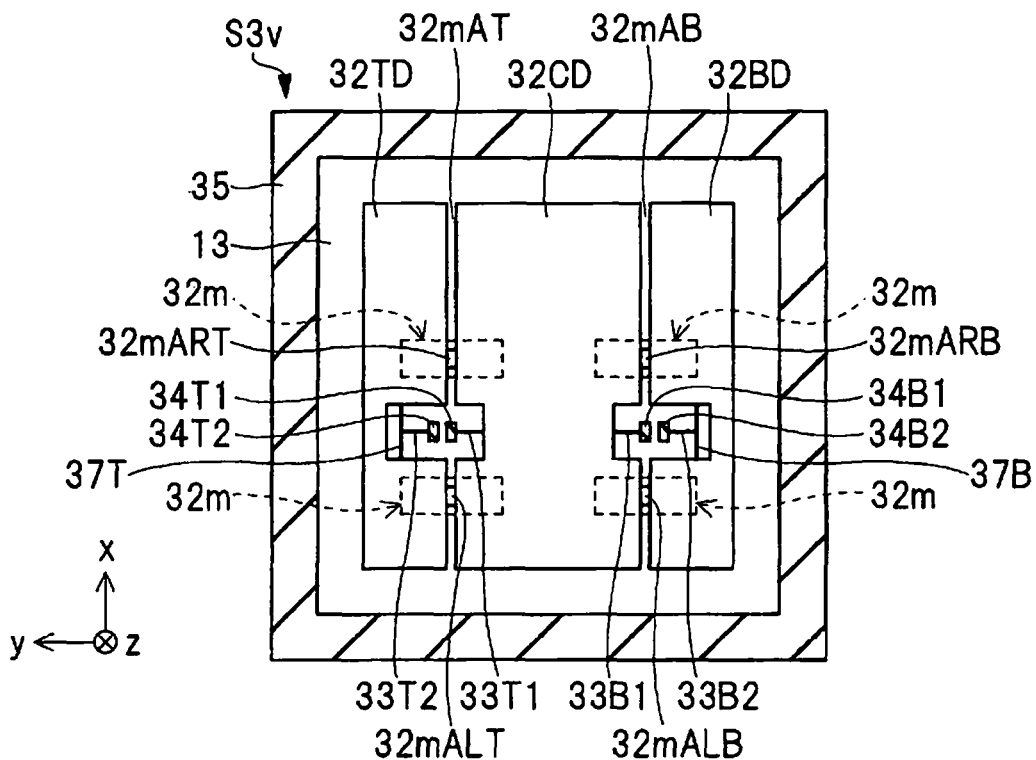
FIG. 29 is a plan view illustrating an upper surface of a membrane layer of an acceleration sensor according to Modification Example 1 of Example 3.
Figure 30:
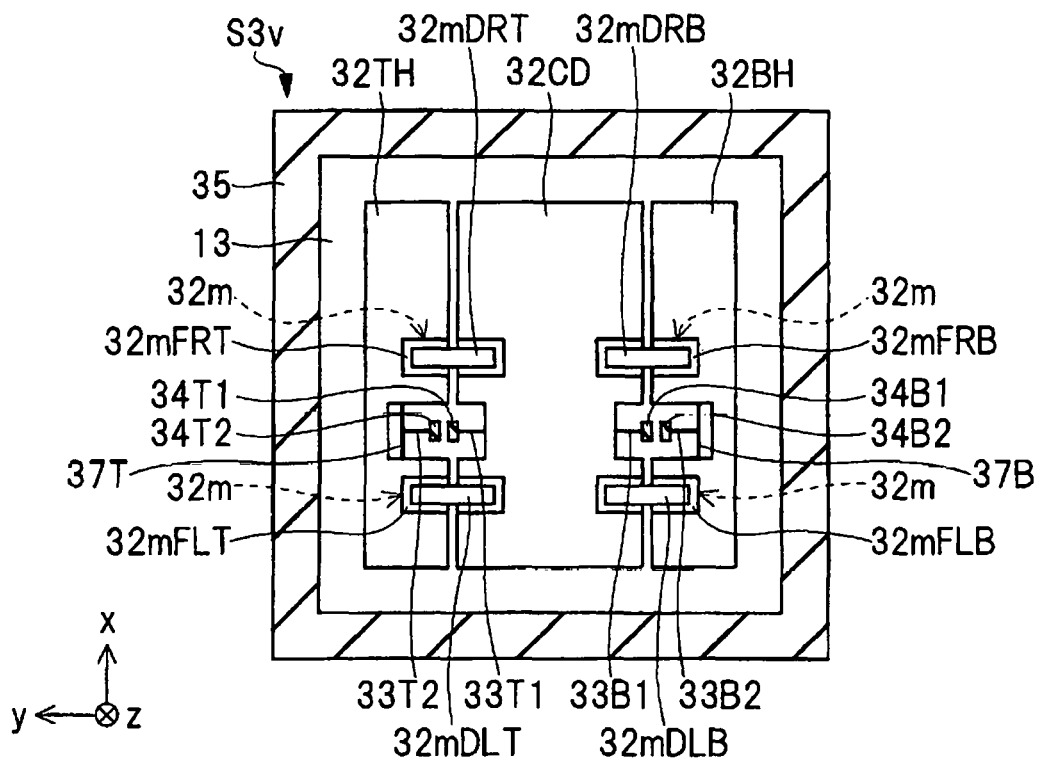
FIG. 30 is a plan view illustrating a lower surface of the membrane layer of the acceleration sensor according to Modification Example 1 of Example 3.

For example, as in an acceleration sensor S3v according to Modification Example 1 illustrated in FIGS. 29 and 30, bending springs 37T and 37B may be respectively disposed at the roots of torsional springs 33T2 and 33B2.

Each of the bending springs 37T and 37B has a shape which is thin in the xy plane, has a thick plate shape in the z-axis direction, and has a shape which is long in the x-axis direction orthogonal to the torsional springs 33T2 and 33B2. In addition, both ends of the bending spring 37T in the x-axis direction are connected to a moving portion 32TH, and the torsional spring 33T2 is mechanically connected to substantially the center portion of the bending spring 37T in the x-axis direction. Similarly, both ends of the bending spring 37B in the x-axis direction are connected to a moving portion 32BH, and the torsional spring 33B2 is mechanically connected to substantially the center portion of the bending spring 37B in the x-axis direction.

For this reason, the moving portion 32TD and the torsional spring 33T2 which are mechanically connected to each other through the bending spring 37T can be integrated with each other in the y-axis direction and the z-axis direction and can be relatively operated in the x-axis direction. Similarly, the moving portion 32BD and the torsional spring 33B2 which are mechanically connected to each other through the bending spring 37B can be integrated with each other in the y-axis direction and the z-axis direction and can be relatively operated in the x-axis direction. Thereby, a force applied to a membrane 32 through the torsional springs 33T2 and 33B2 (for example, see FIG. 2) by a cap layer CapL, a base layer BasL, and a mounting substrate layer SubL is opened.

2. Modification Example 2 of Example 3

Figure 31:
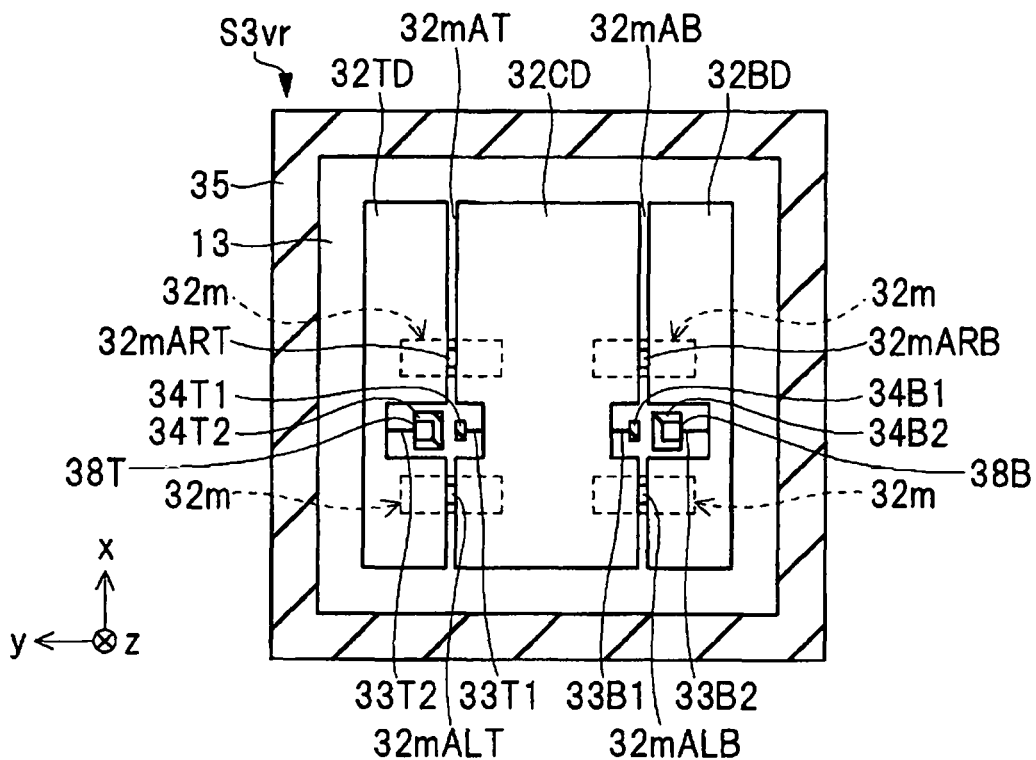
FIG. 31 is a plan view illustrating an upper surface of a membrane layer of an acceleration sensor according to Modification Example 2 of Example 3.
Figure 32:
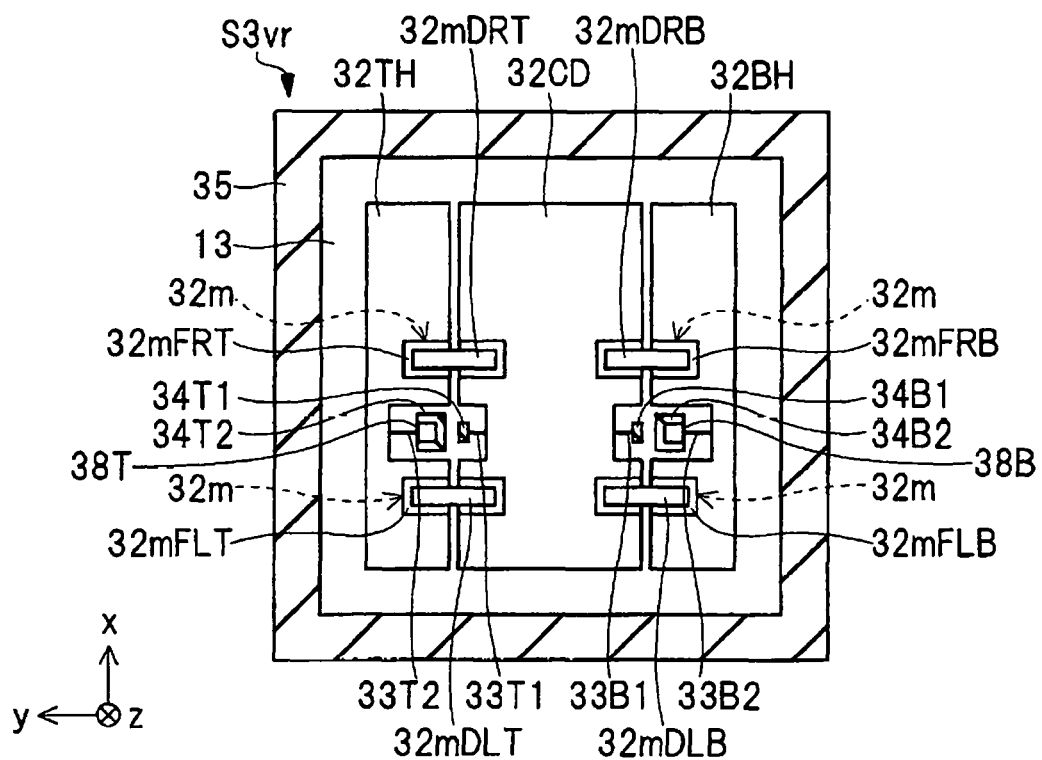
FIG. 32 is a plan view illustrating a lower surface of the membrane layer of the acceleration sensor according to Modification Example 2 of Example 3.

In addition, for example, as in an acceleration sensor S3vr according to Modification Example 2 illustrated in FIGS. 31 and 32, bending springs 38T and 38B may be disposed at the roots of torsional springs 33T2 and 33B2.

Each of the bending springs 38T and 38B has a shape which is thin in the xy plane, has a thick plate shape in the z-axis direction, and has a shape which is long in the x-axis direction orthogonal to the torsional springs 33T2 and 33B2. In addition, both ends of the bending spring 38T in the x-axis direction are connected to a fixed portion 34T2, and the torsional spring 33T2 is mechanically connected to substantially the center portion of the bending spring 38T in the x-axis direction. Similarly, both ends of the bending spring 38B in the x-axis direction are connected to a fixed portion 34B2, and the torsional spring 33B2 is mechanically connected to substantially the center portion of the bending spring 38B in the x-axis direction.

For this reason, the fixed portion 34T2 and the torsional spring 33T2 which are mechanically connected to each other through the bending spring 38T can be integrated with each other in the y-axis direction and the z-axis direction and can be relatively operated in the x-axis direction. Similarly, the fixed portion 34B2 and the torsional spring 33B2 which are mechanically connected to each other through the bending spring 38B can be integrated with each other in the y-axis direction and the z-axis direction and can be relatively operated in the x-axis direction. Thereby, a force applied to a membrane 32 through the torsional springs 33T2 and 33B2 (for example, see FIG. 2) by a cap layer CapL, a base layer BasL, and a mounting substrate layer SubL is opened.

In this manner, also in the acceleration sensor S3*v* according to Modification Example 1 of Example 3 and the acceleration sensor S3*vr* according to Modification Example 2 of Example 3, substantially the same effects as those in the acceleration sensor S3 according to Example 3 are obtained.

While the invention made by the inventor has been described in detail on the basis of the embodiment, the invention is not limited to the embodiment, and it is needless to say that various modifications can be made without departing from the scope of the invention.

What is claimed is:

1. An acceleration sensor, comprising:
   a first substrate;
   a second substrate which is provided so as to be separated from the first substrate in a first direction; and
   a mass body which is provided between the first substrate and the second substrate and is displaceable in the first direction,
   wherein the mass body includes a first moving portion, a second moving portion which is electrically separated from the first moving portion, and a first mechanical junction portion which mechanically connects the first moving portion and the second moving portion to each other in a second direction orthogonal to the first direction,
   wherein the first mechanical junction portion includes a first portion extending in a direction having a first angle with respect to the second direction and a second portion extending in a direction having a second angle different from the first angle with respect to the second direction, in a plane orthogonal to the first direction,
   wherein each of the first moving portion, the second moving portion, and the first mechanical junction portion includes an insulating material, a first conductive layer formed on a first surface of the insulating material, and a second conductive layer formed on a second surface on a side opposite to the first surface of the insulating material,
   wherein the first conductive layer constituting the first moving portion and the first conductive layer constituting the second moving portion are separated from each other by a first gap formed in the first conductive layer of the first mechanical junction portion,
   wherein the second conductive layer constituting the first mechanical junction portion is provided below the first gap,
   wherein the second conductive layer constituting the first moving portion and the second conductive layer constituting the first mechanical junction portion are separated from each other by a second gap, and
   wherein the second conductive layer constituting the second moving portion and the second conductive layer constituting the first mechanical junction portion are separated from each other by a third gap.

2. The acceleration sensor according to claim 1,
   wherein the second conductive layer constituting the first mechanical junction portion DC-electrically floats.

3. The acceleration sensor according to claim 1,
   wherein the second conductive layer is formed below the first gap and the first conductive layer is formed above the second gap and the third gap when seen in a cross-sectional view.

4. The acceleration sensor according to claim 3,
   wherein the insulating material between the first gap and the second conductive layer is removed, and the insulating materials between the second gap and the first conductive layer and between the third gap and the first conductive layer are removed.

5. An acceleration sensor, comprising:
   a first substrate;
   a second substrate which is provided so as to be separated from the first substrate in a first direction; and
   a mass body which is provided between the first substrate and the second substrate and is displaceable in the first direction,
   wherein the mass body includes a first moving portion, a second moving portion which is electrically separated from the first moving portion, and a first mechanical junction portion which mechanically connects the first moving portion and the second moving portion to each other in a second direction orthogonal to the first direction,
   wherein the first mechanical junction portion includes a first portion extending in a direction having a first angle with respect to the second direction and a second portion extending in a direction having a second angle different from the first angle with respect to the second direction, in a plane orthogonal to the first direction, and
   wherein the first mechanical junction portion in the first portion extends in the second direction, and the first mechanical junction portion in the second portion extends in a third direction orthogonal to the first direction and the second direction.

6. The acceleration sensor according to claim 5,
   wherein the first mechanical junction portion has a meander shape in a plane orthogonal to the first direction.

7. An acceleration sensor, comprising:
   a first substrate;
   a second substrate which is provided so as to be separated from the first substrate in a first direction; and
   a mass body which is provided between the first substrate and the second substrate and is displaceable in the first direction,
   wherein the mass body includes a first moving portion, a second moving portion which is electrically separated from the first moving portion, and a first mechanical junction portion which mechanically connects the first moving portion and the second moving portion to each other in a second direction orthogonal to the first direction,
   wherein the first mechanical junction portion includes a first portion extending in a direction having a first angle with respect to the second direction and a second portion extending in a direction having a second angle different from the first angle with respect to the second direction, in a plane orthogonal to the first direction,
   wherein the mass body further includes a third moving portion which is electrically separated from the first moving portion and the second moving portion, and a second mechanical junction portion that mechanically connects the second moving portion and the third moving portion to each other in the second direction, and wherein the second mechanical junction portion includes a third portion extending in a direction having a third angle with respect to the second direction and a fourth portion extending in a direction having a fourth angle different from the third angle with respect to the second direction in a plane orthogonal to the first direction.

* * * * *